US012680954B2

(12) United States Patent
Oeguen et al.

(10) Patent No.: US 12,680,954 B2
(45) Date of Patent: Jul. 14, 2026

(54) SPECTRAL SENSING DEVICE AND METHOD FOR MEASURING OPTICAL RADIATION

(71) Applicant: TRINAMIX GMBH, Ludwigshafen am Rhein (DE)

(72) Inventors: Celal Mohan Oeguen, Ludwigshafen (DE); Thomas Hupfauer, Ludwigshafen (DE); Samiul Islam, Ludwigshafen (DE)

(73) Assignee: TRINAMIX GMBH, Ludwigshafen am Rhein (DE)

( * ) Notice: Subject to any disclaimer, the term of this patent is extended or adjusted under 35 U.S.C. 154(b) by 224 days.

(21) Appl. No.: 18/294,887

(22) PCT Filed: Sep. 5, 2022

(86) PCT No.: PCT/EP2022/074562
§ 371 (c)(1),
(2) Date: Feb. 2, 2024

(87) PCT Pub. No.: WO2023/031448
PCT Pub. Date: Mar. 9, 2023

(65) Prior Publication Data
US 2025/0224332 A1 Jul. 10, 2025

(30) Foreign Application Priority Data

Sep. 6, 2021 (EP) .................................... 21195059

(51) Int. Cl.
*G01N 21/359* (2014.01)
(52) U.S. Cl.
CPC .................................. *G01N 21/359* (2013.01)

(58) Field of Classification Search
CPC .................................................... G01N 21/359
See application file for complete search history.

(56) References Cited

U.S. PATENT DOCUMENTS

2014/0131578 A1    5/2014  Hruska et al.

FOREIGN PATENT DOCUMENTS

WO        2017040431 A1      3/2017
WO        2019115594 A2      6/2019
(Continued)

OTHER PUBLICATIONS

International Search Report and Written Opinion for corresponding PCT/EP22/74562 mailed Dec. 19, 2022, 11 pages.

*Primary Examiner* — Uzma Alam
*Assistant Examiner* — Fani Polyzos Boosalis
(74) *Attorney, Agent, or Firm* — Armstrong Teasdale LLP

(57) ABSTRACT

Disclosed herein are a spectral sensing device and a method for measuring optical radiation. The optical radiation is provided by at least one measurement object and includes non-modulated optical radiation. The spectral sensing device includes
    at least one radiation emitting element;
    at least one photosensitive detector; and
    at least one evaluation unit.
The spectral sensing device is arranged in a manner such that modulated optical radiation is guided within the spectral sensing device towards at least one photosensitive detector. The spectral sensing device and a method for measuring optical radiation are configured to perform, preferably in a fully automatized fashion, a self-calibration of the spectral sensing device without requiring any predefined reflection target.

20 Claims, 5 Drawing Sheets

(56)        References Cited

FOREIGN PATENT DOCUMENTS

| WO | 2019115595 | A1 | 6/2019 | | |
| WO | 2019115596 | A1 | 6/2019 | | |
| WO | 2021069544 | A1 | 4/2021 | | |
| WO | 2021110721 | A1 | 6/2021 | | |
| WO | WO-2024013310 | A1 * | 1/2024 | .......... | G01N 21/359 |

* cited by examiner

SPECTRAL SENSING DEVICE AND METHOD FOR MEASURING OPTICAL RADIATION

CROSS-REFERENCE TO RELATED APPLICATIONS

This application is a U.S. National Phase Application of International Patent Application No. PCT/EP22/74562, filed Sep. 5, 2022, which claims priority to EP Patent Application No. 21195059.7 filed Sep. 6, 2021, and each of which is hereby incorporated by reference herein.

FIELD OF THE INVENTION

The invention relates to a spectral sensing device and methods for measuring optical radiation. Such devices and methods can, in general, be used for investigation or monitoring purposes, in particular in the infrared (IR) spectral region, especially in the near-infrared (NIR) spectral region, as well as for a detection of heat, flames, fire, or smoke. However, further kinds of applications are possible.

PRIOR ART

Known spectral sensing devices, such as spectrometer systems, which may, in particular, be used for diffused reflection spectroscopy, are, typically, calibrated with respect to a wavelength dependent sensitivity of at least one detector element as comprised by the spectral sensing device. Exemplary spectrometer systems are disclosed in US 2014/131578 A1, WO 2019/115594 A1, WO 2019/115595 A1, or WO 2019/115596 A1; however, further kinds spectral sensing device are also known.

In practice, a spectral sensing device may be subject to drifting effects which can, primarily, be caused by alterations that may be related to the spectral sensing device itself or that may have an effect onto the spectral sensing device. Specifically, the alterations may comprise at least one of a degradation of at least one of a radiation source or a detector element as comprised by the device; a temperature drift of at least one of the radiation source or the detector element; a variation of an ambient temperature affecting the device; a variation of a device temperature, i.e. the temperature at which the at least one detector and a corresponding electronics may operate; a mechanical extension or contraction of at least one component as comprised by the device, especially of at least one of a mechanical housing, a holder, or an optical element, in particular at least one of a dispersing element, such as a prism, a beam splitter, or a grating. Further, electrochemical processes or physical processes such as a relaxation of long lifespan traps may lead to drifting effects. However, further kinds of alterations are conceivable.

Specifically, measuring optical radiation with a spectral sensing device may involve a resistance measurement for reading out a photosensitive detector which may as an example comprise a lead sulfide photoconductor. The resistance measurement may specifically be conducted in comparison to further resistors by using strong bias voltages in circuits comprising at least one voltage divider. In such configurations, the resistance of the photosensitive detector may specifically be subject to drifting effects which may distort the measurement data if they are not corrected regularly. Further, noise, specifically $1/f$ noise which is also known as flicker noise, may distort the measurement data.

In practice, the drifting effects require to be corrected from time to time via a process, usually, denoted by the term "calibration", particularly in order to maintain a reliability of the measurement data, specifically by avoiding that the drifting effects may distort measurement data to such an extent that the results as determined by spectral sensing device may become inconclusive. For this purpose, a light calibration and a dark calibration can, preferably, be performed from time to time. Herein, different types of calibration measurements may be executed which, however, require a pre-defined reflection target or an empty volume in front of the at least one photosensitive detector, particularly in order to avoid that reflected radiation may reach the at least one photosensitive detector.

In particular, no calibration target is required in a "dark" measurement for the dark calibration to re-calibrate at last one of a dark current, a dark noise or a dark resistance. For the dark calibration, the at least one radiation source is, typically, turned off. In contrast hereto, a calibration target having a predefined reflection spectrum to guarantee a known and reproducible calibration signal, may for a "light" measurement, in particular for reflection spectroscopy, be positioned in a radiation path from the at least one radiation source to the at least one detector element in the same fashion as at least one measurement object as, typically, used for a spectral measurement, whereby, among others, the wavelength dependent sensitivity of the at least one photosensitive detector may be calibrated.

WO 2017/040431 A1 discloses systems and methods for measuring a concentration and type of substance in a sample at a sampling interface. The systems include a light source, one or more optics, one or more modulators, a reference, a detector, and a controller. The systems and methods can be capable of accounting for drift originating from the light source, one or more optics, and the detector by sharing one or more components between different measurement light paths. Additionally, the systems can be capable of differentiating between different types of drift and eliminating erroneous measurements due to stray light with the placement of one or more modulators between the light source and the sample or reference. Furthermore, the systems can be capable of detecting the substance along various locations and depths within the sample by mapping a detector pixel and a microoptics to the location and depth in the sample.

WO 2021/069544 A1 discloses a device comprising

- at least one array of photoconductors, wherein each photoconductor is configured for exhibiting an electrical resistance dependent on an illumination of its light-sensitive region, wherein at least one photoconductor of the array is designed as characterizing photoconductor;
- at least one bias voltage source, wherein the bias voltage source is configured for applying at least one alternating bias voltage to the characterizing photoconductor or at least one direct current bias voltage to the characterizing photoconductor;
- at least one photoconductor readout circuit, wherein the photoconductor readout circuit is configured for determining of a response voltage of the characterizing photoconductor generated in response to the bias voltage, wherein the response voltage is proportional to a variable characterizing the array of photoconductors, wherein the photoconductor readout circuit is configured for determining of the response voltage of the characterizing photoconductor during operation of the array of photoconductors.

For the calibration of the spectral sensing device, a user is, typically, responsible for positioning the calibration target and for removing any objects that may be placed in the sensing range of the sensing device. This may specifically require the user to be experienced in such technical measures.

Problem Addressed by the Invention

Therefore, the problem addressed by the present invention is that of providing a spectral sensing device and methods for measuring optical radiation which at least substantially avoid the disadvantages of known devices and methods of this type.

In particular, it would be desirous to have a spectral sensing device which is configured to improve an accuracy of generated measurement data, specifically by performing, preferably in a fully automatized fashion, a self-calibration of the spectral sensing device without requiring any pre-defined reflection target or extensive user interaction.

SUMMARY OF THE INVENTION

This problem is solved by the invention with the features of the independent patent claims. Advantageous developments of the invention, which can be implemented individually or in combination, are presented in the dependent claims and/or in the following specification and the detailed embodiments.

In a first aspect of the present invention, a spectral sensing device for measuring optical radiation is disclosed. The optical radiation is provided by at least one measurement object. The optical radiation provided by the at least one measurement object comprises non-modulated optical radiation.

As used herein, the terms "spectral" or "spectrum" refer to a partition of the optical spectral range, wherein the spectrum is constituted by an optical signal defined by a signal wavelength and a corresponding signal intensity. In particular, the spectrum may comprise spectral information related to the at least one measurement object, such as a type and a composition of at least one material forming the at least one measurement object, which can be determined by recording at least one spectrum related to the at least one measurement object. Thus, the term "spectral sensing device", generally, relates to an apparatus which is configured for determining spectral information by recording at least one measured value for at least one signal intensity related to at least one corresponding signal wavelength of optical radiation and by evaluating at least one detector signal which relates to the signal intensity.

As further used herein, the term "optical radiation", generally, refers to a partition of electromagnetic radiation which is, usually, referred to as "optical spectral range" and which comprises at least one of the visible, the ultraviolet, and the infrared spectral ranges. The term "ultraviolet", generally, refers to electromagnetic radiation having a wavelength of 1 nm to 380 nm, preferably of 100 nm to 380 nm. Further, the term "visible", generally, refers to a wavelength of 380 nm to 760 nm. Further, the term "infrared", "abbreviated to IR", generally refers to a wavelength of 760 nm to 1000 μm, wherein the wavelength of 760 nm to 3 μm is, usually, denominated as "near infrared", also abbreviated to "NIR". Preferably, the optical radiation which is used for typical purposes of the present invention may be IR radiation, more preferred, in NIR radiation, especially having a wavelength of 760 nm to 5 μm, preferably of 1 μm to 3 μm.

As further used herein, the term "modulation" refers to a process in which a total power of a signal is varied, preferably periodically, in particular with at least one modulation frequency. The signal may be an electrical signal. The signal may be an optical signal, specifically an illumination. In particular, a periodic modulation can be effected between a maximum value and a minimum value of the total power of the illumination. The minimum value can be 0, but can also be >0, such that, by way of example, complete modulation does not have to be effected. The modulation can be effected within a radiation source designated for generating the desired modulated illumination, specifically via a modulated intensity and/or total power, for example a periodically modulated total power. Further, a modulation device based on an electro-optical effect and/or an acousto-optical effect, can also be used. Further, at least one of a periodic beam interrupting device, in particular a beam chopper, an interrupter blade or an interrupter wheel, can also be used. A modulation of a signal may specifically facilitate detecting the signal and distinguishing it from further signals. Thus, through the modulation of the signal, noise, specifically 1/f-noise, can be reduced significantly.

Consequently, the term "non-modulated" as used herein, generally, refers to an entity which is not modulated, specifically to an illumination which is not modulated, more specifically to optical radiation provided by the at least one measurement object, which is not modulated. The term "measurement object" as used herein, generally, refers to an arbitrary body, chosen from a living object and a non-living object, which comprises material for investigation by the spectral sensing device. Specifically, the at least one measurement object may be or may comprise at least one thermal emitter, e.g. a metallic plate on a heater, emitting non-modulated thermal radiation according to Planck's law. In such case, the spectral sensing device for measuring optical radiation may specifically be used for determining a temperature of the at least one measurement object. As the skilled person knows, electrical modulation of a thermal emitter such as an incandescent lamp may decrease lifetime significantly through repeating switching processes. Further, mechanical modulation, e.g. via a beam chopper, may be instable due to heat exposure. Thus, modulation of the at least one measurement object may be not be expedient in many cases. In further cases, a modulation of the at least one measurement object may not even be implementable with reasonable means. As an example going in this direction, the at least one measurement object may comprise at least one piece of cookware, wherein the at least one piece of cookware may be positioned on a cooktop. In such case, it may specifically desired to measure at least one temperature of the at least one measurement object, which can be derived from the emissivity of the at least one measurement object as the skilled person knows.

As said, the optical radiation is provided by the at least one measurement object. Thus, as indicated above, the optical radiation provided by the at least one measurement object may specifically be emitted by the at least one measurement object. The optical radiation emitted by the at least one measurement object may be indicative of at least one physical property of the at least one measurement object, specifically of a temperature of the at least one measurement object. However, additionally and/or alternatively, the optical radiation provided by the at least one measurement object may also be reflected by the at least one measurement object and/or transmitted through the at least one measurement object. Specifically, the at least one measurement object may be illuminated by at least one external light source emitting optical radiation which may comprise non-modulated optical radiation. The optical radiation emitted by the at least one external light source may scatter at the at least one measurement object. Specifically, the at least one measurement object may at least partially reflect the optical radiation towards the spectral sensing device. Further, the at least one measurement object may at least partially transmit the optical radiation towards the spectral sensing device. Thus, summarizing, the optical radiation provided by the at least one measurement object may be at least one of emitted by the at least one measurement object, reflected by the at least one measurement object and transmitted through the at least one measurement object. Further, the at least one measurement may at least partially absorb the optical radiation emitted by the external light source, which may specifically be indicative of a composition of at least one material forming the at least one measurement object.

Accordingly, the spectral sensing device comprises:

at least one radiation emitting element, wherein the at least one radiation emitting element is designated for emitting modulated optical radiation;

at least one photosensitive detector, wherein the at least one photosensitive detector has at least one photosensitive region designated for receiving optical radiation, wherein at least one detector signal generated by the at least one photosensitive detector is dependent on an illumination of the at least one photosensitive region;

at least one evaluation unit, wherein the at least one evaluation unit is configured for generating at least one piece of measurement information about the illumination of the at least one photosensitive region by the optical radiation provided by the at least one measurement object by using at least one modulated detector signal generated by the illumination of the at least one photosensitive region by a superposition of the modulated optical radiation and the optical radiation provided by the at least one measurement object.

Herein, the spectral sensing device is arranged in a manner that the modulated optical radiation is guided within the spectral sensing device towards the at least one photosensitive detector.

As indicated, the spectral sensing device comprises at least one radiation emitting element. The at least one radiation emitting element is designated for emitting modulated optical radiation. The at least one radiation emitting element can be embodied in various ways. The at least one radiation emitting element can be part of the spectral sensing device in a housing. Alternatively or additionally, the at least one radiation emitting element can also be arranged outside a housing, e.g. as a separate radiation emitting element. The at least one radiation emitting element may be configured to provide sufficient emission in the desired spectral range, preferably in the optical spectral range as defined above or at least one selected partition thereof. The at least one radiation emitting element may, in particular, be comprised by at least one of a thermal radiator or a semiconductor-based radiation source. Herein, the semiconductor-based radiation source may, especially, be selected from at least one of a light emitting diode (LED) or a laser, in particular a laser diode. Further, the thermal radiator may, especially, be selected from at least one of an incandescent lamp or a thermal infrared emitter: As further used herein, the term "thermal infrared emitter" refers to a micro-machined thermally emitting device which comprises a radiation emitting surface as the radiation emitting element that emits the optical radiation to be monitored. Specifically, thermal infrared emitters are available as "emirs50" from Axetris AG, Schwarzenbergstrasse 10, CH-6056 Kägiswil, Switzerland, as "thermal infrared emitters" from LASER COMPONENTS GmbH, Werner-von-Siemens-Str. 15 82140 Olching, Germany, or as "infra-red emitters" from Hawkeye Technologies, 181 Research Drive #8, Milford CT 06460, United States. However; further types of radiation emitting elements, such as a structured light source, may also be feasible.

The at least one radiation emitting element may be a continuous light source or, alternatively, a modulated light source, wherein the modulated light source may have a modulation frequency of at least 1 Hz, of at least 5 Hz, of at least 10 Hz, of at least 50 Hz, of at least 100 Hz, of at least 500 Hz, of at least 1 kHz, or more. For driving the modulated light source, a modulation device can be used, which may be designated for modulating the illumination, preferably by generating a periodic modulation. As already indicated above, the modulation can, preferably, be effected within the light source designated for generating the desired modulated illumination, preferably, by the at least one radiation emitting element itself having a modulated intensity and/or total power, for example a periodically modulated total power, and/or by the at least one radiation emitting element being embodied as a modulated light source, for example as a modulated laser. As a further example, WO 2021/110721 A1 discloses at least one radiation emitting element which is designated for generating optical radiation upon being heated by an electrical current; a mount, wherein the mount carries the at least one radiation emitting element, and wherein the mount or a portion thereof is movable; and a heat sink, wherein the heat sink is designated for cooling the mount and the at least one radiation emitting element being carried by the mount upon being touched by the mount. As said, alternatively or additionally, a different type of modulation device, for example, a modulation device based on an electro-optical effect and/or an acousto-optical effect, can also be used. Further, at least one of a periodic beam interrupting device, in particular a beam chopper, an interrupter blade or an interrupter wheel, can also be used.

Further according to the present invention, the spectral sensing device comprises at least one photosensitive detector. The at least one photosensitive detector has at least one photosensitive region designated for receiving optical radiation. At least one detector signal generated by the at least one photosensitive detector is dependent on an illumination of the at least one photosensitive region. As generally used, the term "photosensitive detector" refers to an optical detector which comprises at least one photosensitive region that is, depending on the illumination of the at least one photosensitive region, designated for generating at least one detector signal, wherein the at least one detector signal may, in particular, be provided to the evaluation unit for evaluation. The at least one photosensitive region as comprised by the at least one photosensitive detector may, preferably, be a single, uniform photosensitive area which is configured for receiving the emitted optical radiation that impinges on the photosensitive area. However, more than one photosensitive areas, such as an areas of pixel-sized photosensitive areas, may also be feasible. The at least one photosensitive detector is designated for generating detector signals, preferably optical or electronic signals, which are associated with the intensity of the emitted optical radiation that impinges on the at least one photosensitive detector. The detector signal may be an analogue and/or a digital signal. In a particular embodiment, the at least one photosensitive detector may be or comprise an active sensor which is adapted to amplify the electronic signals prior to providing it, for example, to the external evaluation unit. For this purpose, the at least one photosensitive detector may comprise one or more signal processing devices, in particular one or more filters and/or analogue-digital-converters for processing and/or prepro-cessing the electronic signals.

The at least one photosensitive detector can be selected from any known optical sensor, in particular from an inor-ganic camera element, preferably from an inorganic camera chip, more preferred from a CCD chip or a CMOS chip, which are, commonly, used in various cameras nowadays. As an alternative, the at least one photosensitive detector, in particular the at least one photosensitive region, may com-prise a photoconductive material, in particular an inorganic photoconductive material, especially selected from lead sulfide (PbS), lead selenide (PbSe), germanium (Ge), indium gallium arsenide (InGaAs, including but not limited to ext. InGaAs), indium antimonide (InSb), or mercury cadmium telluride (HgCdTe or MCT). As generally used, the term "ext. InGaAs" refers to a particular type of InGaAs which exhibits a spectral response up to 2.6 μm. However, different kinds of materials or other types of photosensitive detectors may also be feasible.

Further according to the present invention, the spectral sensing device comprises at least one evaluation unit. As generally used, the term "evaluation unit" refers to an apparatus which is designated for determining at last one piece of information, specifically, selected from spectral information, i.e. information which is related to the spec-trum of the measurement object of which a spectrum has been recorded, in particular, by using the at least one photosensitive detector as described herein, wherein the information is obtained by evaluating the at least one detector signal as generated by the at least one photosensi-tive detector, or measurement information, spectral infor-mation, or calibration information as defined elsewhere herein. The evaluation unit may be or may comprise at least one of an integrated circuit, in particular an application-specific integrated circuit (ASIC), or a data processing device, in particular at least one of a digital signal processor (DSP), a field programmable gate array (FPGA), a micro-controller, a microcomputer, a computer, or an electronic communication unit, specifically a smartphone or a tablet. Further components may be feasible, in particular at least one preprocessing device or data acquisition device. Further, the evaluation unit may comprise at least one interface, in particular at least one of a wireless interface or a wire-bound interface.

Further, the evaluation unit can be designed to, com-pletely or partially, control or drive the spectral sensing device or a part thereof. The evaluation unit may be con-figured to control at least one of the at least one radiation emitting element and the at least one photosensitive detector. The evaluation unit can, in particular, be designed to carry out at least one measurement cycle in which a plurality of detector signals may be picked up. The information as determined by the evaluation unit may, in particular, be provided to at least one of a further apparatus, or to a user, preferably in at least one of an electronic, visual, acoustic, or tactile fashion. Further, the information may be stored in at least one data storage unit, specifically in an internal data storage unit as comprised by the spectral sensing device, in particular by the at least one evaluation unit, or in an separate storage unit to which the information may be transmitted via the at least one interface. The separate storage unit may be comprised by the at least one electronic communication unit. The storage unit may in particular be configured for storing at least one electronic table, such as at least one look-up table.

The evaluation unit may, preferably, be configured to perform at least one computer program, in particular at least one computer program performing or supporting the step of generating the at information. By way of example, one or more algorithms may be implemented which, by using the at least one detector signal as at least one input variable, may perform a transformation into a piece of information. For this purpose, the evaluation unit may, particularly, comprise at least one data processing device, in particular at least one of an electronic or an optical data processing device, which can be designed to generate the information by evaluating the at least one detector signal. Thus, the evaluation unit is designed to use at least one detector signal as the at least one input variable and to generate the information by processing the at least one input variable. The processing can be performed in a consecutive, a parallel, or a combined manner. The evaluation unit may use an arbitrary process for generating the information, in particular by calculation and/or using at least one stored and/or known relationship.

In accordance with the present invention, the at least one evaluation unit is configured for generating at least one piece of measurement information about the illumination of the at least one photosensitive region by the optical radiation provided by the at least one measurement object by using at least one modulated detector signal generated by the illu-mination of the at least one photosensitive region by a superposition of the modulated optical radiation and the optical radiation provided by the at least one measurement object. The term "piece of measurement information" as used herein, generally, refers to at least one of data, knowl-edge or evidence providing a qualitative and/or quantitative description of at least one of the at least one photosensitive detector, specifically the at least one photosensitive region, and the at least one measurement object. Specifically, the at least on piece of measurement information may relate to a responsivity of the at least one photosensitive detector. The term "responsivity" as used herein, generally, refers to an input-output gain of a detector, specifically to a ratio of electrical power output of the at least one photosensitive detector per optical power input. Thus, the responsivity may be indicative of the response of the at least one photosen-sitive detector to an illumination of the at least one photo-sensitive region, specifically by the at least one measure-ment object. Specifically, the responsivity of the at least one photosensitive detector may be dependent on an intensity of optical radiation impinging the at least one photosensitive detector, specifically the at least one photosensitive region. Thus, generally, the larger the intensity of the optical radia-tion impinging the at least one photosensitive detector is, the larger the response of the at least one photosensitive detector may be. As already indicated, the optical radiation imping-ing the at least one photosensitive detector may specifically be a superposition of optical radiation from different sources, specifically a superposition of the modulated opti-cal radiation and the optical radiation provided by the at least one measurement object. In particular, the at least one piece of measurement information may comprise at least one of a change $\Delta R$ in a resistance of the at least one photosensitive detector and at least one responsivity dependent quotient of the at least one photosensitive detector. The at least one responsivity dependent quotient of the at least one photo-sensitive detector may specifically be defined as a quotient of the change $\Delta R$ in the resistance of the at least one photosensitive detector divided by a DC resistance Roc of the at least one photosensitive detector. The change $\Delta R$ in the resistance of the at least one photosensitive detector may specifically be or may comprise an AC resistance of the at least one photosensitive detector. A total resistance of the at least one photosensitive detector may refer to a sum of the DC resistance Roc of the at least one photosensitive detector and the change $\Delta R$ in the resistance of the at least one photosensitive detector, specifically the AC resistance of the at least one photosensitive detector. Above and in the following DC refers to direct current and AC refers to alternating current.

The change $\Delta R$ in the resistance of the at least one photosensitive detector may be induced by a superposition of the optical radiation provided by the at least one measurement object with the modulated optical radiation emitted by the at least one radiation emitting element at the at least one photosensitive detector. As said, the optical radiation provided by the at least one measurement object comprises non-modulated optical radiation. The non-modulated optical radiation may induce a DC resistance Roc of the at least one photosensitive detector. The modulated optical radiation emitted by the at least one radiation emitting element may induce a change $\Delta R$ in the resistance of the at least one photosensitive detector. Specifically, the at least one radiation emitting element may be modulated periodically, more specifically at a designated modulation frequency. Thus, the modulated optical radiation emitted by the at least one radiation emitting element may in particular induce a periodic temporal change in the total resistance of the at least one photosensitive detector, specifically in form of an AC resistance. The change $\Delta R$ in the resistance of the at least one photosensitive detector may depend on the DC resistance Roc of the at least one photosensitive detector, since the responsivity of the at least one photosensitive detector may decrease with increasing optical radiation from the measurement object. As an example, the optical radiation provided by the at least one measurement object may be so strong that the at least one photosensitive detector may be saturated and, thus, the change $\Delta R$ in the resistance of the at least one photosensitive detector would be zero or at least very small. As a further example, the optical radiation provided by the at least one measurement object may be so weak that it is not effecting the at least one photosensitive detector, so that the change $\Delta R$ in the resistance of the at least one photosensitive detector would be very large.

As indicated above, the change $\Delta R$ in the resistance of the at least one photosensitive detector may be a function of the DC resistance Roc of the at least one photosensitive detector. Further, in case of the at least one measurement object comprising at least one thermal radiator, the DC resistance Roc of the at least one photosensitive detector may be a function of at least one of a temperature of the at least one measurement object and an emissivity of the at least one measurement object. As used herein, the term "emissivity" relates to an effectivity of the at least one radiation emitting element to emit thermal radiation. More particular, the emissivity refers to a material property of the at least one radiation emitting element by which the intensity of the thermal radiation that is emitted by the at least one radiation emitting element. In general, the emissivity is indicated by a value of 0 to 1, wherein the value of 1 corresponds to a surface of a perfect black body that emits thermal radiation in accordance with Planck's law, wherein the emissivity of the at least one radiation emitting element, usually, assumes a value below 1 but above 0, typically above 0.5, more typically, above 0.8, preferably above 0.9.

The spectral sensing device may further comprise at least one readout circuit configured for reading out the at least one photosensitive detector, specifically in a resistance measurement. The term "readout circuit" as used herein, generally, refers to an arbitrary device configured for quantifying and processing at least one physical property and/or a change in the at least one physical property detected by at least one measurement device, specifically by the at least one photosensitive detector. As mentioned above, the at least one photosensitive detector may specifically comprise at least one lead sulfide photoconductor. Photoconductors may generally change their conductivity upon illumination and, thus, their resistance, which may consequently be quantified in a resistance measurement. Thus, the measured resistance may allow to draw conclusions on an incident optical radiation. A resistance measurement may be conducted in comparison to further resistors, specifically further resistors with known resistance. The further resistors may in particular be arranged in a voltage divider within the readout circuit.

The readout circuit may specifically be configured for measuring the DC resistance Roc of the at least one photosensitive detector and/or the change $\Delta R$ in the resistance of the at least one photosensitive detector. The readout circuit may comprise at least one of a resistance meter, a voltage divider and a pass filter, specifically a high-pass filter. The change $\Delta R$ in the resistance of the at least one photosensitive detector may specifically be small compared to the DC resistance Roc of the at least one photosensitive detector. The high-pass filter may filter the DC resistance Roc of the at least one photosensitive detector and only allow the smaller change $\Delta R$ in the resistance of the at least one photosensitive detector to pass.

As outlined above, the spectral sensing device is arranged in a manner that the modulated optical radiation is guided within the spectral sensing device towards the at least one photosensitive detector. As generally used, the term "guiding" or any grammatical variation thereof refers to effecting a propagation of the optical radiation in a desired direction, in particular by reflecting or transmitting a portion of the optical radiation. The spectral sensing device may comprise at least one optical element configured for guiding the modulated optical radiation towards the at least one photosensitive detector. The term "optical element" as used herein, generally, refers to an arbitrary element configured for changing at least one optical property of incident optical radiation, e.g. an intensity of the optical radiation or a direction of at least a part of the optical radiation. The at least one optical radiation may scatter at the optical element. The at least one optical radiation may at least partially be reflected by the optical element and/or transmitted through the optical element and/or absorbed by the optical element.

An interaction between the optical radiation and the at least one optical element may depend on at least one physical property of the optical radiation, specifically on at least one of an incidence angle of the optical radiation and/or at least one wavelength of the optical radiation. As the skilled person will know, the wavelength of the optical radiation may also be expressed in terms of an optical frequency, a wavenumber or an energy. The interaction between the optical radiation and the at least one optical element may further depend on at least one physical property of the at least one optical element, specifically on at least one of a refraction index of the at least one optical element, an optical density of the at least one optical element, a thickness of the at least one optical element, and at least one surface condition of at least one surface of the at least one optical element. The at least one optical element may be or may comprise at least one of a mirror, a window, a lens, an aperture, a grating, a prism and an optical filter. The at least one optical element may comprise at least one partially reflecting optical element. The at least one partially reflecting optical element may be designated for reflecting the modulated optical radiation emitted by the at least one radiation emitting element towards the at least one photosensitive detector. The at least one partially reflecting optical element may be transparent with respect to the optical radiation provided by the at least one measurement object. Thus, the optical radiation provided by the at least one measurement object may be transmitted through the at least one partially reflecting optical element, specifically towards the at least one photosensitive detector.

The at least one radiation emitting element may be designated for emitting the modulated optical radiation in a manner that the modulated optical radiation may have a constant illumination power. Specifically, an average illumination power of the modulated optical radiation may be constant over larger time intervals. An amplitude of the modulated optical radiation may specifically be modulated periodically at a constant modulation frequency. As the skilled person will know, the amplitude of optical radiation relates to the illumination power. Thus, within one period the illumination power of the modulated optical radiation may naturally alternate. However, over a time interval, which comprises a plurality of periods, the average illumination power may specifically be constant. More specifically, a maximum amplitude of the modulated optical radiation may be constant, wherein the modulated optical radiation may specifically be modulated periodically at a constant modulation frequency. The illumination power being constant may, specifically, facilitate an evaluation of the modulated optical radiation, since no time variation of the illumination power has to be taken into account in such case.

The spectral sensing device may comprise at least two individual photosensitive detectors. The at least one photosensitive region of at least one first photosensitive detector may be designated for receiving the modulated optical radiation. The at least one photosensitive region of at least one second photosensitive detector may be designated for receiving the optical radiation provided by the at least one measurement object and the modulated optical radiation. Thus, in this constellation, the at least one second photosensitive detector may be used for generating the at least one piece of measurement information, whereas the at least one first photosensitive detector may be used for correcting drifting effects at the at least one second photosensitive detector. The at least one first photosensitive detector and the at least one second photosensitive detector may specifically be structurally identical or may at least have similar characteristics, specifically a similar responsivity. For this purpose, at least one of a detector array, a multi-pixel system and a detector-matrix may be used. Thus, the at least one photosensitive detector may comprise at least one of a detector array, a multi-pixel system and a detector-matrix. As used herein, the terms "first" or "second" are considered as a description of an element without specifying an order or a chronological sequence and without excluding a possibility that other elements of the same type may be present.

The spectral sensing device may further comprise at least one radiation separating element. The at least one radiation separating element may be designated and arranged for separating the modulated optical radiation from the optical radiation provided by the at least one measurement object. The at least one radiation separating element may comprise at least one first optical filter element. The at least one first optical filter element may be designated and arranged in a manner that the at least one photosensitive region of the at least one first photosensitive detector only receives the modulated optical radiation. The term "optical filter element" as used herein, generally, refers to an arbitrary device configured for selectively blocking optical radiation according to at least one physical property of the optical radiation such as a wavelength of the optical radiation and/or a polarization of the optical radiation. Thus, the at least one first optical filter element may be configured for blocking the optical radiation provided by the at least one measurement object and the at least one second optical filter element may be configured for blocking the modulated optical radiation emitted by the at least one radiation emitting element.

The at least one radiation separating element may comprise at least one non-transparent optical element. The at least one non-transparent optical element may be designated and arranged in a manner that the at least one photosensitive region of the at least one first photosensitive detector only receives the modulated optical radiation. Specifically, the at least one non-transparent optical element may be or may comprise at least one opaque material. The at least one non-transparent optical element may specifically be opaque over a wavelength range comprising a wavelength range of the modulated optical radiation emitted by the at least one radiation emitting element and a wavelength range of the optical radiation emitted by the at least one measurement object.

The spectral sensing device may further comprise at least one further radiation emitting element. The at least one further radiation emitting element may be designated for emitting further modulated optical radiation. The at least one evaluation unit may further be configured for generating at least one piece of spectral information about the at least one measurement object by using at least one modulated detector signal as generated by the illumination of the at least one photosensitive region by a superposition of the optical radiation provided by the at least one measurement object and the further modulated optical radiation; and the at least one piece of measurement information.

The spectral sensing device may, as particularly preferred, be arranged in a manner that the further modulated optical radiation is guided towards the at least one measurement object.

Specifically, the spectral sensing device may be arranged in a manner that the further modulated optical radiation is guided towards the at least one measurement object in such fashion that the further modulated optical radiation is subsequently reflected towards the at least one photosensitive detector, specifically the at least one photosensitive region, by the at least one measurement object. Thus, the further modulated optical radiation may be informative about at least one optical property of the measurement object, specifically about at least one of a reflexivity, an emissivity and an absorptivity. A transmission of optical radiation through the at least one measurement object may be negligible, specifically for metallic surfaces. Thus, the emissivity may be calculated as 1 minus the reflectivity. As the skilled person will further know, at least one of the reflexivity, the emissivity and the absorptivity may be wavelength-dependent.

For the term "spectral information", reference can be made to the description above. Generating at least one piece of spectral information about the at least one measurement object may comprise measuring the optical radiation as provided by the at least one measurement object. Specifically, the optical radiation provided by the at least one measurement object may be measured by determining the change $\Delta R$ in the resistance of the at least one photosensitive detector and/or calculating the at least one responsivity dependent quotient of the at least one photosensitive detector. More specifically, in case the at least one measurement object comprises at least one thermal radiator, a temperature of the at least one measurement object may be derived from measuring the change $\Delta R$ in the resistance of the at least one photosensitive detector and/or calculating the at least one responsivity dependent quotient of the at least one photosensitive detector. By this, specifically, a long-time drift of a non-modulated measurement object may be removed. Specifically, a measurement of the DC resistance of the at least one measurement object may still be performed as a main measurement method for measuring the optical radiation provided by the at least one measurement object, wherein the measurement of the DC resistance of the at least one measurement object may be calibrated at regular or irregular time intervals by using the at least one piece of measurement information.

The at least one evaluation unit may further be configured for

> generating at least one piece of calibration information by further comparing the at least one modulated detector signal as generated by the illumination of the at least one photosensitive region by the modulated optical radiation and at least one further modulated detector signal as generated by the illumination of the at least one photosensitive region by the further modulated optical radiation.

As generally used, the term "calibration" refers to a process of correcting from time to time drifting effects that may occur, in practice, in the spectral sensing device, primarily caused by alterations related to the spectral sensing device itself or having an effect onto the spectral sensing device. The alterations may, especially, comprise at least one of: a degradation of at least one of the radiation emitting element or the photosensitive detector; a temperature drift of at least one of the radiation emitting element or the photosensitive detector; a variation of an ambient temperature affecting the spectral sensing device; a variation of a temperature related to the spectral sensing device, i.e. the temperature at which the at least one photosensitive detector and a corresponding electronics may operate; a mechanical extension or contraction of at least one component as comprised by the spectral sensing device, especially of at least one of a mechanical housing, a holder, or an optical element, specifically of the at least one optical window. However, further alterations may also be feasible. Further, electrochemical processes or physical processes such as a relaxation of long lifespan traps may lead to drifting effects. Correcting the drifting effects may particularly facilitate maintaining a reliability of measurement data, specifically by avoiding that the drifting effects may distort the measurement data to such an extent that results as determined by the spectral sensing device may become inconclusive.

Consequently, the term "piece of calibration information" as used herein, generally, refers to at least one of data, knowledge or evidence providing a qualitative and/or quantitative description of at least one entity, such as on a physical property of an element or object, which can be used for a calibration. The at least one piece of calibration information may be or may comprise at least one of a calibration factor, a calibration curve, or calibration function, which may, preferably, be stored in a data storage unit as a calibration file, specifically, in form of at least one of a table, a set of values and associated functions, in parameterized form, or as a functional equation. The at least one piece of calibration information may be recorded in a look-up table. Specifically, the at least one piece of calibration information may relate to a responsivity of the at least one photosensitive detector. The at least one photosensitive detector may be calibrated continuously by using the at least one piece of calibration information, specifically simultaneously to measuring optical radiation provided by the at least one measurement object. The further modulated optical radiation emitted by the at least one further radiation emitting element may be different to the modulated optical radiation emitted by the at least one radiation emitting element, in particular in terms of a modulation frequency. Thus, the at least one photosensitive detector may simultaneously detect both the further modulated optical radiation emitted by the at least one further radiation emitting element and the modulated optical radiation emitted by the at least one radiation emitting element in parallel and differentiate between them. Also, the at least one photosensitive detector may be calibrated at regular or irregular time intervals by using the at least one piece of calibration information.

Specifically, the at least one further radiation emitting element may be structurally identical to the at least one radiation emitting element or may at least have similar characteristics, specifically emission characteristics such as illumination power and/or wavelength range. However, a modulation of the modulated optical radiation emitted by the at least one radiation emitting element may specifically be different compared to a further modulation of the modulated optical radiation emitted by the at least one further radiation emitting element. Thus, the modulated optical radiation may be distinguishable from the further modulated optical radiation when detected by the at least one photosensitive detector. Specifically, the at least one radiation emitting element and the at least one further radiation emitting element may be modulated sequentially. Further, the at least one radiation emitting element and the at least one further radiation emitting element may be modulated simultaneously at different modulation frequencies. The modulated optical radiation emitted by the at least one radiation emitting element may induce a change $\Delta R_1$ in a resistance at the at least one photosensitive detector. The further modulated optical radiation emitted by the at least one radiation emitting element may induce a change $\Delta R_2$ in a resistance at the at least one photosensitive detector. Thus, the at least one piece of calibration information may be derived from comparing the change $\Delta R_1$ in the resistance at the at least one photosensitive detector with the change $\Delta R_2$ in the resistance at the at least one photosensitive detector. For further details concerning at least one further radiation emitting element, reference may be made to the description of the at least one radiation emitting element, as provided above.

The at least one further radiation emitting element may be designated for emitting the further modulated optical radiation in a manner that the further modulated optical radiation has a constant illumination power. The spectral sensing device may be arranged in a manner that the further modulated optical radiation is reflected by the at least one measurement object, specifically reflected towards the at least one photosensitive detector. Thus, the at least one further radiation emitting element may illuminate the at least one measurement object with the further modulated optical radiation. The further modulated optical radiation may scatter at the at least one measurement object. Specifically, the further modulated optical radiation may be at least partially absorbed at the at least one measurement object, wherein the absorption may be characteristic for at least one physical property of the at least one measurement object such as a composition of at least one material forming the at least one measurement object. Thus, the modulated optical radiation reflected by the at least one measurement object may carry at least one piece of information about the at least one physical property of the at least one measurement object. The modulated optical radiation reflected by the at least one measurement object may comprise diffusely reflected optical radiation holding spectral information about the at least one measurement object. The modulated optical radiation reflected by the at least one measurement object may comprise directly reflected optical radiation, specifically via Fresnel reflection, holding emissivity information about the at least one measurement object.

Thus, by comparing the change $\Delta R_1$ in the resistance at the at least one photosensitive detector and the change $\Delta R_2$ in the resistance at the at least one photosensitive detector, the optical radiation provided by the at least one measurement object may further be measured, specifically at least one of a chemical composition, an emissivity and a temperature of the at least one measurement object may be determined. Specifically, in a first measurement, the change $\Delta R_1$ in the resistance at the at least one photosensitive detector and the change $\Delta R_2$ in the resistance at the at least one photosensitive detector may be compared for calculating at least one responsivity dependent quotient. In a second measurement, the at least one responsivity dependent quotient may be weighed for calculating at least one of the chemical composition, the emissivity and the temperature of the at least one measurement object.

The spectral sensing device may comprise at least two individual photosensitive detectors. The at least one photosensitive region of at least one further first photosensitive detector may be designated for receiving the modulated optical radiation. The at least one photosensitive region of at least one further second photosensitive detector may be designated for receiving the further modulated optical radiation and the optical radiation provided by the at least one measurement object. The spectral sensing device may comprise at least one further radiation separating element. The at least one further radiation separating element may be designated and arranged for separating the modulated optical radiation from the further modulated optical radiation. The at least one further radiation separating element may specifically be structurally identical to the radiation separating element discussed above or at least have similar characteristics, specifically optical characteristics. Thus, for further details concerning the further radiation separating element and embodiments thereof, reference may be made to the radiation separating element and embodiments thereof as provided above.

The at least one further radiation separating element may comprise at least one of at least one further first optical filter element and at least one further second optical filter element. The at least one further first optical filter element may be designated and arranged in a manner that the at least one photosensitive region of the at least one further first photosensitive detector only receives the modulated optical radiation. The at least one further second optical filter element may be designated and arranged in a manner that the at least one photosensitive region of the at least one further second photosensitive detector only receives the further modulated optical radiation and the optical radiation provided by the at least one measurement object.

The at least one further radiation separating element may comprise at least one further non-transparent optical element. The at least one further non-transparent optical element may be designated and arranged in a manner that the at least one photosensitive region of the at least one further first photosensitive detector only receives the modulated optical radiation and the at least one photosensitive region of the at least one further second photosensitive detector only receives the further modulated optical radiation and the optical radiation provided by the at least one measurement object.

The least two individual photosensitive detectors may be arranged in a manner that the at least one photosensitive region of the at least one further first photosensitive detector only receives the modulated optical radiation and the at least one photosensitive region of the at least one further second photosensitive detector receives the modulated optical radiation, the further modulated optical radiation, and the optical radiation provided by the at least one measurement object. The spectral sensing device may comprise two further first individual photosensitive detectors. The at least one photosensitive region of one of the at least two further first photosensitive detectors may only receive the modulated optical radiation. The at least one photosensitive region of another one of the at least two further first photosensitive detectors may receive the modulated optical radiation and the optical radiation provided by the at least one measurement object.

The spectral sensing device may comprise at least one further partially reflecting optical element. The at least one partially reflecting optical element may be designated for reflecting the modulated optical radiation emitted by the at least one radiation emitting element towards the at least one photosensitive detector and transmitting the further optical radiation emitted by the at least one further emitting element towards the at least one measurement object. Specifically, the reflection at the at least one further partially reflecting optical element may be or may comprise Fresnel reflection. As generally used, the term "Fresnel reflection" refers to a type of optical reflection as a result of an interface between at least two media having different refractive indices. The at least one further partially reflecting optical element is transparent with respect to the optical radiation provided by the measurement object.

The spectral sensing device may further comprise at least one temperature stabilizing element. The at least one temperature stabilizing element may be designated for maintaining a temperature of at least one of the at least one photosensitive detector, the at least one radiation emitting element and, if appropriate, the at least one further radiation emitting element, at a constant level. Maintaining the temperature at a constant level may facilitate avoiding drifting effects during measurement. The term "temperature stabilizing element" as used herein, generally, refers to at least one of a heat sink and an heat pump, wherein the heat pump is designated for actively transferring heat between at least two spatial areas, thereby generating a heat flux between the at least two spatial areas. The temperature stabilizing element may, specifically, be based on the Peltier effect in order to create the heat flux. For this purpose, the temperature stabilizing element may, especially, comprise at least one thermoelectric cooler. A direction of the heat flux may depend on a direction of an electrical current applied to the thermoelectric cooler. Depending on the direction of the heat flux, the temperature stabilizing element can be used for cooling at least one spatial area by transferring heat to at least one further spatial area, or for heating the at least one spatial area by transferring heat from the at least one further spatial area. However, further kinds of temperature stabilizing elements may also be feasible.

In a further aspect of the present invention, a method for measuring optical radiation emitted by at least one measurement object is disclosed. The optical radiation emitted by the at least one measurement object comprises non-modulated optical radiation. The method for measuring optical radiation according to the present invention comprises the following steps:

a) emitting modulated optical radiation by using at least one radiation emitting element, wherein the modulated optical radiation is guided within the spectral sensing device towards at least one photosensitive detector, wherein the at least one photosensitive detector has at least one photosensitive region designated for receiving optical radiation, wherein at least one detector signal generated by the at least one photosensitive detector is dependent on an illumination of the at least one photosensitive region;

b) generating at least one piece of measurement information about the illumination of the at least one photosensitive region by the optical radiation provided by the at least one measurement object by using at least one evaluation unit by using at least one detector signal generated by the illumination of the at least one photosensitive region by a superposition of the modulated optical radiation and the optical radiation provided by the at least one measurement object.

The method may, further, comprise the following steps:

c) emitting further modulated optical radiation by using at least one further radiation emitting element, wherein the further modulated optical radiation is guided towards the at least one measurement object; and d) generating at least one piece of spectral information about the at least one measurement object by using the at least one evaluation unit by using at least one modulated detector signal as generated by the illumination of the at least one photosensitive region by a superposition of the optical radiation provided by the at least one measurement object and the further modulated optical radiation; and the at least one piece of measurement information.

The method may, further, comprise the following steps:

e) generating at least one piece of calibration information by using the at least one evaluation unit by further comparing the at least one detector signal generated by the illumination of the at least one photosensitive region by the modulated optical radiation and at least one further detector signal generated by the illumination of the at least one photosensitive region by the further modulated optical radiation.

Steps a) to e) may be performed in a continuous or discontinuous fashion, wherein steps a) to e) may, at least partially, be performed in a simultaneous manner. Specifically, in case steps c) to e) are performed, steps a) and c) may be performed in a simultaneous manner and steps b) and e) may be performed in a simultaneous manner, before, eventually, step d) may be performed. Further, additional steps whether listed herein or not can also be performed.

In step e), the at least one piece of calibration information may be generated by differentiating the at least one detector signal from the at least one further detector signal by using at least one of a modulated optical radiation and a further modulated optical radiation differing by at least one modulation frequency;

at least one first photosensitive region and at least one second photosensitive region differing by at least one spectral responsivity.

In a further aspect, the present invention refers to computer program, which comprises executable instructions which, when the program is executed by a computer, cause the computer to carry out the steps of the method for measuring optical radiation as described elsewhere herein. The computer program comprising executable instructions may, preferably, fully or partially be integrated into the evaluation unit, in particular into a data processing device, in particular a computer or an electronic communication unit, specifically a smartphone or a tablet. The computer program may be capable of performing the method using at least one data processing unit already comprised by the evaluation unit, in particular the electronic communication unit. By way of example, the method may be performed as an application, also denoted by the term "app", on the electronic communication unit.

In a further aspect of the present invention, a use of a spectral sensing device according to the present invention is disclosed. Therein, the use of the spectral sensing device for a purpose of determining information, in particular spectral information, which is related to the at least one measurement object is proposed. Herein, the spectral sensing device may, preferably, be used for a purpose of use, selected from the group consisting of: an infrared detection application; a spectroscopy application; an exhaust gas monitoring application; a combustion process monitoring application; a pollution monitoring application; an industrial process monitoring application; a mixing or blending process monitoring; a chemical process monitoring application; a food processing process monitoring application; a food preparation process monitoring; a water quality monitoring application; an air quality monitoring application; a quality control application; a temperature control application; a motion control application; an exhaust control application; a gas sensing application; a gas analytics application; a motion sensing application; a chemical sensing application; a mobile application; a medical application; a mobile spectroscopy application; a food analysis application; an agricultural application, in particular characterization of soil, silage, feed, crop or produce, monitoring plant health; a plastics identification and/or recycling application. However, further applications may also be feasible.

For further details concerning the method for measuring optical radiation, the corresponding computer program, and the respective uses of the spectral sensing device according to the present invention, reference may be made to the description of the spectral sensing device for measuring optical radiation as provided elsewhere herein.

The spectral sensing device and the method for measuring optical radiation as disclosed herein have considerable advantages over the prior art. The spectral sensing device and the method according to the present invention is configured to perform, preferably in a fully automatized fashion, a self-calibration without requiring any predefined reflection target. Further, modulation of the signals may lead to noise reduction, specifically 1/f noise. In particular, the spectral sensing device and the method may be used to enhance a reliability of measurement results of the spectral sensing device and multi-pixel sensing solutions, and may, especially, be used for enabling self-calibration of IR sensing modules based on multi-pixel solutions. As a result, the spectral sensing device and the method as disclosed herein may facilitate use and calibration of the devices by a user. Thus, spectral sensing devices of this kind can be used by everyday users in consumer electronics.

As used herein, the terms "have", "comprise" or "include" or any arbitrary grammatical variations thereof are used in a non-exclusive way. Thus, these terms may both refer to a situation in which, besides the feature introduced by these terms, no further features are present in the entity described in this context and to a situation in which one or more further features are present. As an example, the expressions "A has B", "A comprises B" and "A includes B" may both refer to a situation in which, besides B, no other element is present in A (i.e. a situation in which A solely and exclusively consists of B) and to a situation in which, besides B, one or more further elements are present in entity A, such as element C, elements C and D or even further elements.

Further, as used herein, the terms "preferably", "more preferably", "particularly", "more particularly", "specifically", "more specifically" or similar terms are used in conjunction with optional features, without restricting alternative possibilities. Thus, features introduced by these terms are optional features and are not intended to restrict the scope of the claims in any way. The invention may, as the skilled person will recognize, be performed by using alternative features. Similarly, features introduced by "in an embodiment of the invention" or similar expressions are intended to be optional features, without any restriction regarding alternative embodiments of the invention, without any restriction regarding the scope of the invention and without any restriction regarding the possibility of combining the features introduced in such a way with other optional or non-optional features of the invention.

Summarizing, in the context of the present invention, the following embodiments are regarded as particularly preferred:

Embodiment 1: A spectral sensing device for measuring optical radiation provided by at least one measurement object, wherein the optical radiation provided by the at least one measurement object comprises non-modulated optical radiation, the spectral sensing device comprising:

at least one radiation emitting element, wherein the at least one radiation emitting element is designated for emitting modulated optical radiation;

at least one photosensitive detector, wherein the at least one photosensitive detector has at least one photosensitive region designated for receiving optical radiation, wherein at least one detector signal generated by the at least one photosensitive detector is dependent on an illumination of the at least one photosensitive region;

at least one evaluation unit, wherein the at least one evaluation unit is configured for generating at least one piece of measurement information about the illumination of the at least one photosensitive region by the optical radiation provided by the at least one measurement object by using at least one modulated detector signal as generated by the illumination of the at least one photosensitive region by a superposition of the modulated optical radiation and the optical radiation provided by the at least one measurement object, wherein the spectral sensing device is arranged in a manner that the modulated optical radiation is guided within the spectral sensing device towards the at least one photosensitive detector.

Embodiment 2: The spectral sensing device according to the preceding Embodiment, wherein the at least one radiation emitting element is comprised by at least one of a thermal radiator or a semiconductor-based radiation source.

Embodiment 3: The spectral sensing device according to the preceding Embodiment, wherein the at least one semiconductor-based radiation source is selected from at least one of a light emitting diode (LED) or a laser, in particular a laser diode.

Embodiment 4: The spectral sensing device according to any one of the preceding Embodiments, wherein the least one photosensitive detector is selected from a known optical sensor, in particular from an inorganic camera element, preferably from an inorganic camera chip, more preferred from a CCD chip or a CMOS chip.

Embodiment 5: The spectral sensing device according to any one of the preceding Embodiments, wherein the least one photosensitive detector, in particular the at least one photosensitive region, comprises at least one photoconductive material.

Embodiment 6: The spectral sensing device according to the preceding Embodiment, wherein the at least one photoconductive material is selected from at least one of PbS, PbSe, Ge, InGaAs, InSb, or HgCdTe.

Embodiment 7: The spectral sensing device according to any one of the preceding Embodiments, wherein the emitted optical radiation comprises a wavelength of 760 nm to 1000 μm (infrared spectral range).

Embodiment 8: The spectral sensing device according to the preceding Embodiment, wherein the emitted optical radiation comprises a wavelength of 760 nm to 3 μm (near-infrared spectral range).

Embodiment 9: The spectral sensing device according to the preceding Embodiment, wherein the emitted optical radiation comprises a wavelength of 1 μm to 3 μm.

Embodiment 10: The spectral sensing device according to any one of the preceding Embodiments, wherein the evaluation unit is further designed to, completely or partially, control or drive the spectral sensing device or a part thereof.

Embodiment 11: The spectral sensing device according to any one of the preceding Embodiments, wherein the evaluation unit is further configured to control at least one of the at least one radiation emitting element and the at least one photosensitive detector.

Embodiment 12: The spectral sensing device according to any one of the preceding Embodiments, wherein the at least one piece of measurement information as determined by the evaluation unit is provided to at least one of a further apparatus or to a user in at least one of an electronic, visual, acoustic, or tactile fashion.

Embodiment 13: The spectral sensing device according to any one of the preceding Embodiments, wherein the at least one piece of measurement information as determined by the evaluation unit is stored in at least one data storage unit.

Embodiment 14: The spectral sensing device according to the preceding Embodiment, wherein the at least one data storage unit is comprised by the spectral sensing device, in particular by the at least one evaluation unit.

Embodiment 15: The spectral sensing device according to any one of the two preceding Embodiments, wherein the at least one data storage unit is a separate storage unit.

Embodiment 16: The spectral sensing device according to the preceding Embodiment, wherein the separate storage unit is comprised by the at the least one electronic communication unit.

Embodiment 17: The spectral sensing device according to the two preceding Embodiments, wherein the at least one piece of measurement information is transmitted to the separate storage unit via at least one interface, in particular a wireless interface and/or a wire-bound interface.

Embodiment 18: The spectral sensing device according to any one of the preceding Embodiments, wherein the at least one piece of measurement information relates to a responsivity of the at least one photosensitive detector.

Embodiment 19: The spectral sensing device according to any one of the preceding Embodiments, wherein the at least one piece of measurement information comprises at least one of a change $\Delta R$ in a resistance of the at least one photosensitive detector and a responsivity dependent quotient of the at least one photosensitive detector.

Embodiment 20: The spectral sensing device according to the preceding Embodiment, wherein the at least one responsivity dependent quotient is defined as a quotient of the change $\Delta R$ in the resistance of the at least one photosensitive detector divided by a DC resistance Roc of the at least one photosensitive detector.

Embodiment 21: The spectral sensing device according to any one of the two preceding Embodiments, wherein the change $\Delta R$ in the resistance of the at least one photosensitive detector is induced by a superposition of the optical radiation provided by the at least one measurement object with the modulated optical radiation emitted by the at least one radiation emitting element at the at least one photosensitive detector.

Embodiment 22: The spectral sensing device according to any one of the preceding Embodiments, wherein the spectral sensing device further comprises at least one readout circuit configured for reading out the at least one photosensitive detector, specifically in a resistance measurement.

Embodiment 23: The spectral sensing device according to the preceding Embodiment, wherein the readout circuit is configured for measuring a DC resistance Roc of the at least one photosensitive detector and/or a change $\Delta R$ in the resistance of the at least one photosensitive detector.

Embodiment 24: The spectral sensing device according to any one of the two preceding Embodiments, wherein the readout circuit comprises at least one of a resistance meter, a voltage divider and a pass filter, specifically a high-pass filter.

Embodiment 25: The spectral sensing device according to any one of the preceding Embodiments, wherein the at least one radiation emitting element is designated for emitting the modulated optical radiation in a manner that the modulated optical radiation has a constant illumination power.

Embodiment 26: The spectral sensing device according to any one of the preceding Embodiments, comprising at least two individual photosensitive detectors, wherein the at least one photosensitive region of at least one first photosensitive detector is designated for receiving the modulated optical radiation; and the at least one photosensitive region of at least one second photosensitive detector is designated for receiving the optical radiation provided by the at least one measurement object and the modulated optical radiation.

Embodiment 27: The spectral sensing device according to any one of the two preceding Embodiments, further comprising at least one radiation separating element, wherein the at least one radiation separating element is designated and arranged for separating the modulated optical radiation from the optical radiation provided by the at least one measurement object.

Embodiment 28: The spectral sensing device according to the preceding Embodiment, wherein the at least one radiation separating element comprises at least one first optical filter element, wherein the at least one first optical filter element is designated and arranged in a manner that the at least one photosensitive region of the at least one first photosensitive detector only receives the modulated optical radiation.

Embodiment 29: The spectral sensing device according to any one the two preceding Embodiments, wherein the at least one radiation separating element comprises at least one non-transparent optical element, wherein the at least one non-transparent optical element is designated and arranged in a manner that the at least one photosensitive region of the at least one first photosensitive detector only receives the modulated optical radiation.

Embodiment 30: The spectral sensing device according to any one of the preceding Embodiments, wherein the optical radiation provided by the at least one measurement object is at least one of emitted by the at least one measurement object; reflected by the at least one measurement object; transmitted through the at least one measurement object.

Embodiment 31: The spectral sensing device according to any one of the preceding Embodiments, further comprising at least one optical element configured for guiding the modulated optical radiation towards the at least one photosensitive detector.

Embodiment 32: The spectral sensing device according to the preceding Embodiment, wherein the at least one optical element comprises at least one partially reflecting optical element designated for reflecting the modulated optical radiation emitted by the at least one radiation emitting element towards the at least one photosensitive detector.

Embodiment 33: The spectral sensing device according to the preceding Embodiment, wherein the at least one partially reflecting optical element is transparent with respect to the optical radiation provided by the at least one measurement object.

Embodiment 34: The spectral sensing device according to any one of the preceding Embodiments, further comprising at least one further radiation emitting element, wherein the at least one further radiation emitting element is designated for emitting further modulated optical radiation;

wherein the at least one evaluation unit is further configured for generating at least one piece of spectral information about the at least one measurement object by using at least one modulated detector signal as generated by the illumination of the at least one photosensitive region by a superposition of the optical radiation provided by the at least one measurement object and the further modulated optical radiation; and the at least one piece of measurement information, wherein the spectral sensing device is arranged in a manner that the further modulated optical radiation is guided towards the at least one measurement object.

Embodiment 35: The spectral sensing device according to the preceding Embodiment, wherein the at least one evaluation unit is further configured for generating at least one piece of calibration information by comparing the at least one modulated detector signal as generated by the illumination of the at least one photosensitive region by the modulated optical radiation and at least one further modulated detector signal as generated by the illumination of the at least one photosensitive region by the further modulated optical radiation.

Embodiment 36: The spectral sensing device according to any one of the two preceding Embodiments, wherein the at least one further radiation emitting element is designated for emitting the further modulated optical radiation in a manner that the further modulated optical radiation has a constant illumination power.

Embodiment 37: The spectral sensing device according to any one of the three preceding Embodiments, wherein the spectral sensing device is arranged in a manner that the further modulated optical radiation is reflected by the at least one measurement object.

Embodiment 38: The spectral sensing device according to any one of the four preceding Embodiments, comprising at least two individual photosensitive detectors, wherein the at least one photosensitive region of at least one further first photosensitive detector is designated for receiving the modulated optical radiation; and the at least one photosensitive region of at least one further second photosensitive detector is designated for receiving the further modulated optical radiation and the optical radiation provided by the at least one measurement object.

Embodiment 39: The spectral sensing device according to the preceding Embodiment, further comprising at least one further radiation separating element, wherein the at least one further radiation separating element is designated and arranged for separating the modulated optical radiation from the further modulated optical radiation.

Embodiment 40: The spectral sensing device according to the preceding Embodiment, wherein the at least one further radiation separating element comprises at least one of at least one further first optical filter element, wherein the at least one further first optical filter element is designated and arranged in a manner that the at least one photosensitive region of the at least one further first photosensitive detector only receives the modulated optical radiation;

at least one further second optical filter element, wherein the at least one further second optical filter element is designated and arranged in a manner that the at least one photosensitive region of the at least one further second photosensitive detector only receives the further modulated optical radiation and the optical radiation provided by the at least one measurement object.

Embodiment 41: The spectral sensing device according to any one the two preceding Embodiments, wherein the at least one further radiation separating element comprises at least one further non-transparent optical element, wherein the at least one further non-transparent optical element is designated and arranged in a manner that the at least one photosensitive region of the at least one further first photosensitive detector only receives the modulated optical radiation, and the at least one photosensitive region of the at least one further second photosensitive detector only receives the further modulated optical radiation and the optical radiation provided by the at least one measurement object.

Embodiment 42: The spectral sensing device according to any one of the three preceding Embodiments, wherein the least two individual photosensitive detectors are arranged in a manner that the at least one photosensitive region of the at least one further first photosensitive detector only receives the modulated optical radiation; and the at least one photosensitive region of the at least one further second photosensitive detector receives the modulated optical radiation, the further modulated optical radiation, and the optical radiation provided by the at least one measurement object.

Embodiment 43: The spectral sensing device according to the preceding Embodiment, comprising at least two further first individual photosensitive detectors, wherein the at least one photosensitive region of one of the at least two further first photosensitive detectors only receives the modulated optical radiation; and the at least one photosensitive region of another one of the at least two further first photosensitive detectors receives the modulated optical radiation and the optical radiation provided by the at least one measurement object.

Embodiment 44: The spectral sensing device according to any one of the ten preceding Embodiments, further comprising at least one further partially reflecting optical element, wherein the at least one further partially reflecting optical element is designated for reflecting the modulated optical radiation emitted by the at least one radiation emitting element towards the at least one photosensitive detector and transmitting the further optical radiation emitted by the at least one further emitting element towards the at least one measurement object.

Embodiment 45: The spectral sensing device according to the preceding Embodiment, wherein the at least one further partially reflecting optical element is transparent with respect to the optical radiation provided by the measurement object.

Embodiment 46: The spectral sensing device according to any one of the preceding Embodiments, further comprising at least one temperature stabilizing element, wherein the at least one temperature stabilizing element is designated for maintaining a temperature of at least one of the at least one photosensitive detector; and the at least one radiation emitting element at a constant level.

Embodiment 47: The spectral sensing device according to the preceding Embodiment, wherein the at least one temperature stabilizing element is optionally designated for maintaining a temperature of the at least one further radiation emitting element at a constant level.

Embodiment 48: A method for measuring optical radiation provided by at least one measurement object, wherein the optical radiation provided by the at least one measurement object comprises non-modulated optical radiation, the method comprising the following steps:

a) emitting modulated optical radiation by using at least one radiation emitting element, wherein the modulated optical radiation is guided within the spectral sensing device towards at least one photosensitive detector, wherein the at least one photosensitive detector has at least one photosensitive region designated for receiving optical radiation, wherein at least one detector signal generated by the at least one photosensitive detector is dependent on an illumination of the at least one photosensitive region;

b) generating at least one piece of measurement information about the illumination of the at least one photosensitive region by the optical radiation provided by the at least one measurement object by using at least one evaluation unit by using at least one detector signal generated by the illumination of the at least one photosensitive region by a superposition of the modulated optical radiation and the optical radiation provided by the at least one measurement object.

Embodiment 49: The method according to the preceding Embodiment, further comprising the following steps:

c) emitting further modulated optical radiation by using at least one further radiation emitting element, wherein the further modulated optical radiation is guided towards the at least one measurement object; and d) generating at least one piece of spectral information about the at least one measurement object by using the at least one evaluation unit by using at least one modulated detector signal as generated by the illumination of the at least one photosensitive region by a superposition of the optical radiation provided by the at least one measurement object and the further modulated optical radiation; and the at least one piece of measurement information.

Embodiment 50: The method according to any one of the preceding Embodiments referring to a method, further comprising the following step:

e) generating at least one piece of calibration information by using the at least one evaluation unit by further comparing the at least one detector signal as generated by the illumination of the at least one photosensitive region by the modulated optical radiation and at least one further detector signal as generated by the illumination of the at least one photosensitive region by the further modulated optical radiation.

Embodiment 51: The method according to the preceding Embodiment, wherein the at least one piece of calibration information is generated by differentiating the at least one detector signal from the at least one further detector signal by using at least one of a modulated optical radiation and a further modulated optical radiation differing by at least one modulation frequency;

at least one first photosensitive region and at least one second photosensitive region differing by at least one spectral responsivity.

Embodiment 52: A computer program comprising instructions which, when the program is executed by a computer, cause the computer to carry out the steps of the method for measuring optical radiation.

Embodiment 53: A use of a spectral sensing device according to any one of the preceding Embodiments referring to a spectral sensing device or to a method for measuring optical radiation, for a purpose of use, selected from the group consisting of: an infrared detection application; a spectroscopy application; an exhaust gas monitoring application; a combustion process monitoring application; a pollution monitoring application; an industrial process monitoring application; a mixing or blending process monitoring; a chemical process monitoring application; a food processing process monitoring application; a food preparation process monitoring; a water quality monitoring application; an air quality monitoring application; a quality control application; a temperature control application; a motion control application; an exhaust control application; a gas sensing application; a gas analytics application; a motion sensing application; a chemical sensing application; a mobile application; a medical application; a mobile spectroscopy application; a food analysis application; an agricultural application, in particular characterization of soil, silage, feed, crop or produce, monitoring plant health; a plastics identification and/or recycling application.

BRIEF DESCRIPTION OF THE FIGURES

Further optional details and features of the invention are evident from the description of preferred exemplary embodiments which follows in conjunction with the dependent claims. In this context, the particular features may be implemented alone or with features in combination.

The invention is not restricted to the exemplary embodiments. The exemplary embodiments are shown schematically in the figures. Identical reference numerals in the individual figures refer to identical elements or elements with identical function, or elements which correspond to one another with regard to their functions.

Specifically, in the figures:

FIGS. 1 to 5C illustrate each a schematic view of an exemplary embodiment of a spectral sensing device; and FIG. 6 illustrates a schematic view of an exemplary embodiment of a method for measuring optical radiation according to the present invention.

EXEMPLARY EMBODIMENTS

Figure 1:
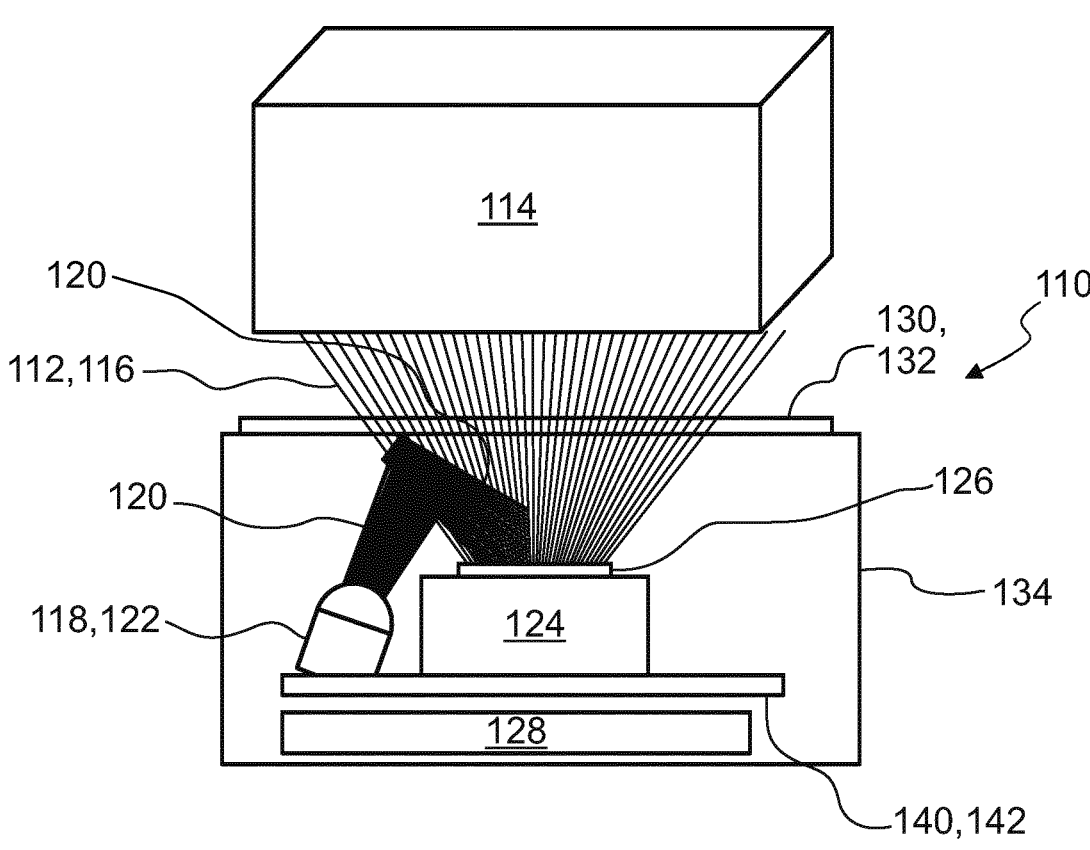

FIGS. 1 to 5C illustrate each, in a highly schematic fashion, an exemplary embodiment of a spectral sensing device 110 according to the present invention. The spectral sensing device 110 is configured for measuring optical radiation 112 provided by at least one measurement object 114. The optical radiation 112 provided by the at least one measurement object 114 comprises non-modulated optical radiation 116. The optical radiation 112 may comprise at least one of the visible, the ultraviolet, and the infrared spectral ranges of electromagnetic radiation. According to the present invention, the spectral sensing device 110 may, especially, be adapted for recording a spectrum in the infrared (IR) spectral region, preferably, in the near-infrared (NIR), especially, wherein for a wavelength of 760 nm to 3 µm, preferably of 1 µm to 3 µm. Accordingly, the spectral sensing device 110 can be used for investigation or monitoring purposes as well as for a detection of heat, flames, fire, or smoke.

Specifically, the measurement object 114 may comprise at least one thermal emitter, e.g. a metallic plate on a heater, emitting non-modulated thermal radiation according to Planck's law. In such case, the spectral sensing device 110 for measuring optical radiation may specifically be used for determining a temperature of the at least one measurement object 114. As an example going in this direction, the at least one measurement object 114 may comprise at least one piece of cookware, wherein the at least one piece of cookware may be positioned on a cooktop. In such case, it may specifically desired to measure at least one temperature of the at least one measurement object 114, which can be derived from the emissivity of the at least one measurement object 114 as the skilled person will know. However, further applications of the spectral sensing device 110 may also be feasible. Thus, the optical radiation 112 provided by the at least one measurement object 114 may specifically be emitted by the at least one measurement object 114. However, additionally and/or alternatively, the optical radiation 112 provided by the at least one measurement object may also be reflected by the at least one measurement object 114 and/or transmitted through the at least one measurement object 114. Specifically, the at least one measurement object 114 may be illuminated by at least one external light source (not depicted here).

The spectral sensing device 110 comprises at least one radiation emitting element 118. The radiation emitting element 118 is designated for emitting modulated optical radiation 120. In particular, the radiation emitting element 118 may be comprised by a semiconductor-based radiation source 122 which may, preferably, be selected from at least one of a light emitting diode (LED) or a laser, in particular a laser diode. However, a further type of radiation emitting element 118 may also be feasible such as a thermal radiator (not depicted here). The radiation emitting element 118 may be continuously emitting, or generating modulated optical pulses, as described above in more detail. The radiation emitting element 118 may be designated for emitting the modulated optical radiation 120 in a manner that the modulated optical radiation 120 has a constant illumination power.

The spectral sensing device 110 comprises at least one photosensitive detector 124. The photosensitive detector 124 has at least one photosensitive region 126 designated for receiving the optical radiation 112. At least one detector signal generated by the at least one photosensitive detector 124 is dependent on an illumination of the at least one photosensitive region 124. The at least one photosensitive detector 124 can be selected from any known optical sensor, in particular from an inorganic camera element, preferably from an inorganic camera chip, more preferred from a CCD chip or a CMOS chip. The photosensitive region 126 may, preferably, comprise at least one photoconductive material, particularly, selected from lead sulfide (PbS), lead selenide (PbSe), germanium (Ge), indium gallium arsenide (InGaAs, including but not limited to ext. InGaAs), indium antimonide (InSb), or mercury cadmium telluride (HgCdTe or MCT). However, a further kind of photoconductive material or an other type of photosensitive detector may also be feasible.

The spectral sensing device 110 comprises at least one at least one evaluation unit 128. The evaluation unit 128 is configured for generating at least one piece of measurement information about the illumination of the at least one photosensitive region 126 by the optical radiation 112 provided by the at least one measurement object 114 by using at least one modulated detector signal generated by the illumination of the at least one photosensitive region 126 by a superposition of the modulated optical radiation 120 and the optical radiation 112 provided by the at least one measurement object 114.

Further, the evaluation unit may comprise at least one interface, in particular at least one of a wireless interface or a wire-bound interface to one or more elements of the sensing device 110. Further, the evaluation unit 128 can be designed to, completely or partially, control or drive one or more of the other elements of the spectral sensing device 110. The evaluation unit 128 may be configured to control at least one of the radiation emitting element 118 and the photosensitive detector 124. The evaluation unit 128 can, in particular, be designed to carry out at least one measurement cycle in which a plurality of detector signals may be picked up. The information as determined by the evaluation unit 128 may, in particular, be provided to at least one of a further apparatus, or to a user, preferably in at least one of an electronic, visual, acoustic, or tactile fashion. Further, the information may be stored in at least one data storage unit (not depicted here), specifically in an internal data storage unit as comprised by the spectral sensing device 110, in particular by the at least one evaluation unit 128, or in a separate storage unit, which may be comprised by a communication unit (not depicted here). At least one of the piece of spectral information or the piece of measurement information may be transmitted to the separate storage unit via at least one interface, in particular a wireless interface and/or a wire-bound interface. The storage unit may in particular be configured for storing at least one electronic table, such as at least one look-up table.

The at least one piece of measurement information, as generated by the evaluation unit 128, may relate to a responsivity of the photosensitive detector 124. Specifically, the at least one piece of measurement information may comprise at least one of a change $\Delta R$ in a resistance of the photosensitive detector 124 and a responsivity dependent quotient of the photosensitive detector 124. The at least one responsivity dependent quotient may be defined as a quotient of the change $\Delta R$ in the resistance of the photosensitive detector 124 divided by a DC resistance Roc of the photosensitive detector 124. The change $\Delta R$ in the resistance of the photosensitive detector 124 may be induced by a superposition of the optical radiation 112 provided by the measurement object 114 with the modulated optical radiation 120 emitted by the radiation emitting element 118 at the photosensitive detector 124. As FIG. 1 shows, an optical path of the optical radiation 112 provided by the measurement object 114 may cross an optical path of the modulated optical radiation 120 emitted by the radiation emitting element 118 at the photosensitive detector 124. Thus, the optical radiation 112 provided by the measurement object 114 may interfere with the modulated optical radiation 120 emitted by the radiation emitting element 118 before detection by the photosensitive detector 124.

The spectral sensing device 110 may further comprise at least one readout circuit. The readout circuit may be configured for reading out the photosensitive detector 124, specifically in a resistance measurement. The readout circuit may be configured for measuring a DC resistance Roc of the photosensitive detector 124 and/or a change $\Delta R$ in the resistance of the photosensitive detector 124. The readout circuit may comprise at least one of a resistance meter, a voltage divider and a pass filter, specifically a high-pass filter (not depicted here).

The spectral sensing device 110 is arranged in a manner that the modulated optical radiation is guided within the spectral sensing device 110 towards the at least one photosensitive detector 124. The spectral sensing device 110 may comprise at least one optical element 130 configured for guiding the modulated optical radiation 120 towards the at least one photosensitive detector 124. The optical element 130 may comprise at least one partially reflecting optical element 132. The at least one partially reflecting optical 132 element may be designated for reflecting the modulated optical radiation 120 emitted by the at least one radiation emitting element 118 towards the at least one photosensitive detector 124. The at least one partially reflecting optical 132 element may be transparent with respect to the optical radiation 112 provided by the at least one measurement object 114. Thus, the optical radiation 112 provided by the at least one measurement object 114 may be transmitted through the at least one partially reflecting optical element 132, specifically towards the at least one photosensitive detector 124.

As FIG. 1 shows, the radiation emitting element 118 may be positioned laterally offset to the photosensitive detector 124. The measurement object 114 may be positioned in front of the spectral sensing device 110. The spectral sensing device 110 may comprise at least one housing 134. The housing 134 may at least partially surround the further components of the spectral sensing device 110. Thus, the housing 134 may specifically decouple sensitive components of the spectral sensing device 110 from environmental influences. The partially reflecting optical element 132 may be enclosed in the housing 134 and may be positioned at a side of the housing 134 facing the measurement object 114. In this constellation, the modulated optical radiation 120 emitted by the radiation emitting element 118 may be directed towards the partially reflecting optical element 132. The partially reflecting optical element 132 may then reflect the modulated optical radiation 120 emitted by the radiation emitting element 118 towards the photosensitive detector 124. At the same time, the optical radiation 112 provided by the measurement object 114 may enter the spectral sensing device 110 though the partially reflecting optical element 132 and interfere with the modulated optical radiation 120 emitted by the radiation emitting element 118 within the spectral sensing device 110 before detection by the photosensitive detector 124.

Figure 2:
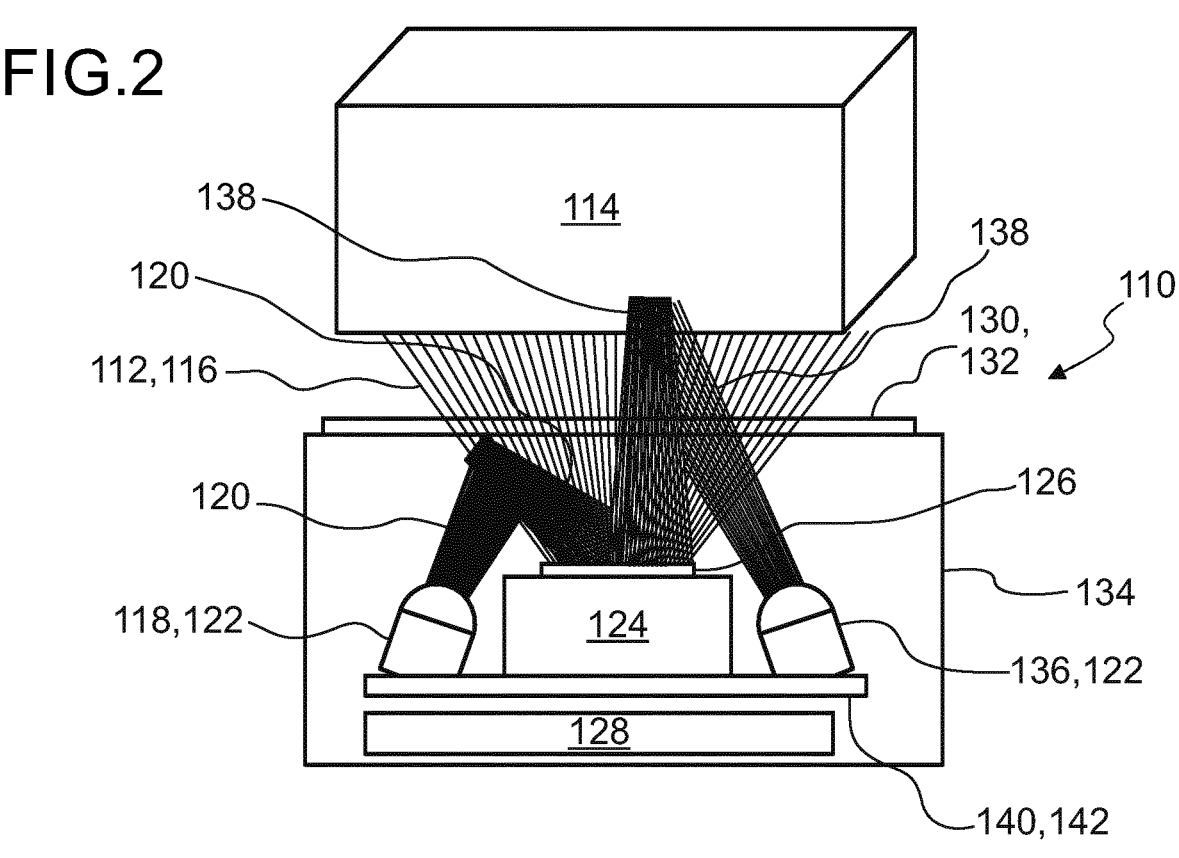

In a preferred Embodiment, as indicated in FIG. 2, the spectral sensing device 110 may additionally comprise at least one further radiation emitting element 136. The further radiation emitting element 136 may be designated for emitting further modulated optical radiation 138. The further radiation emitting element 136 may also be positioned laterally offset to the photosensitive detector 124, specifically opposite to the radiation emitting element 118. The further radiation emitting element 136 may be designated for emitting the further modulated optical radiation 138 in a manner that the further modulated optical radiation 138 has a constant illumination power. Specifically, the further radiation emitting element 136 may be structurally identical to the at least one radiation emitting element 118 or may at least have similar characteristics, specifically emission characteristics such as illumination power and/or wavelength range. Thus, for further details regarding the further radiation emitting element 136, reference may be made to the description of the at least one radiation emitting element 118 as provided above.

The evaluation unit 128 may further be configured for generating at least one piece of spectral information about the at least one measurement object 114 by using at least one modulated detector signal generated by the illumination of the at least one photosensitive region 126 by the optical radiation 112 provided by the at least one measurement object 114 and the further modulated optical radiation 138, and the at least one piece of measurement information. The evaluation unit 128 may further be configured for generating at least one piece of calibration information by further comparing the at least one modulated detector signal as generated by the illumination of the at least one photosensitive region 126 by the modulated optical radiation 120 and at least one further modulated detector signal as generated by the illumination of the at least one photosensitive region 126 by the further modulated optical radiation 138.

The spectral sensing device 110 may be arranged in a manner that the further modulated optical radiation 138 may be guided towards the measurement object 114. Further, the spectral sensing device 110 may be arranged in a manner that the further modulated optical radiation 138 may be reflected by the measurement object 114, specifically towards the photosensitive detector 124. As FIG. 2 shows, the further modulated optical radiation 138 may be transmitted through the partially reflecting optical element 132. Thus, the partially reflecting optical element 132 may be designated for transmitting the further optical radiation 138 emitted by the at least one further emitting element 136 towards the at least one measurement object 114. The further optical radiation 138 emitted by the at least one further emitting element 136 may then scatter at the measurement object 114 and may specifically at least partially be reflected towards the photosensitive detector 124. Before impinging the photosensitive detector 124, the further modulated optical radiation 138 may enter the spectral sensing device 110 through the partially reflecting optical element 132 and may interfere with the modulated optical radiation 120 emitted by the radiation emitting element 118 and/or with the optical radiation 112 provided by the measurement object 114.

The spectral sensing device 110 may further comprise at least one temperature stabilizing element 140. The temperature stabilizing element 140, may be designated for maintaining a temperature of at least one of the photosensitive detector 124, the radiation emitting element 118 and the further radiation emitting element 136 at a constant level. This may specifically facilitate avoiding drifting effects during measurement. The temperature stabilizing element 140 may specifically comprise at least one thermoelectric cooler 142. As FIG. 2 shows, the radiation emitting element 118, the photosensitive detector 124 and the further radiation emitting element 136 may be positioned side by side on the temperature stabilizing element 140 and may, thus, be stabilized simultaneously.

Figure 3:
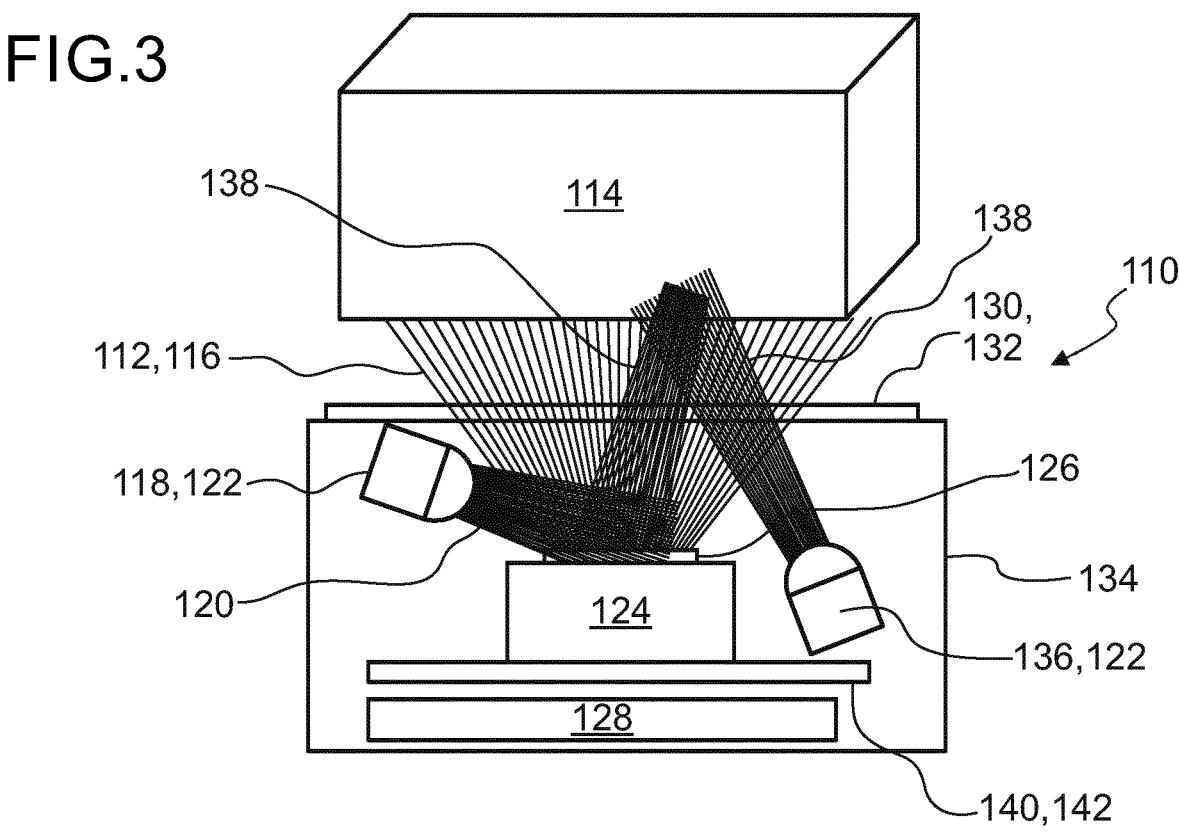

As FIG. 3 shows, the temperature stabilizing element 140 may alternatively only stabilize the photosensitive detector 124. In consequence, the radiation emitting element 118 and/or the further radiation emitting element 136 may not be positioned on the temperature stabilizing element 140. As a result, an arrangement of the radiation emitting element 118 and/or the further radiation emitting element 136 may be more flexible. Specifically, the radiation emitting element 118 may be positioned such that it may directly illuminate the photosensitive detector 124.

Figure 4A:
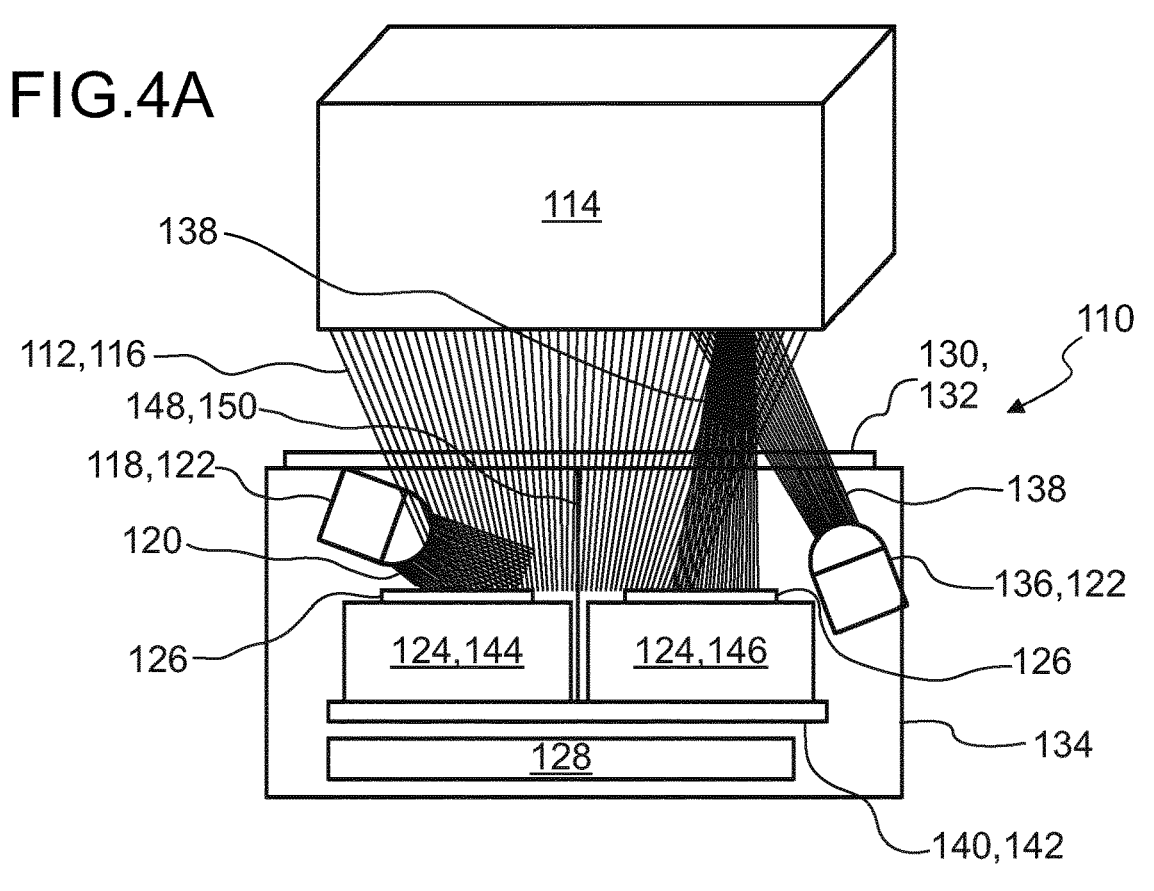
Figure 4B:
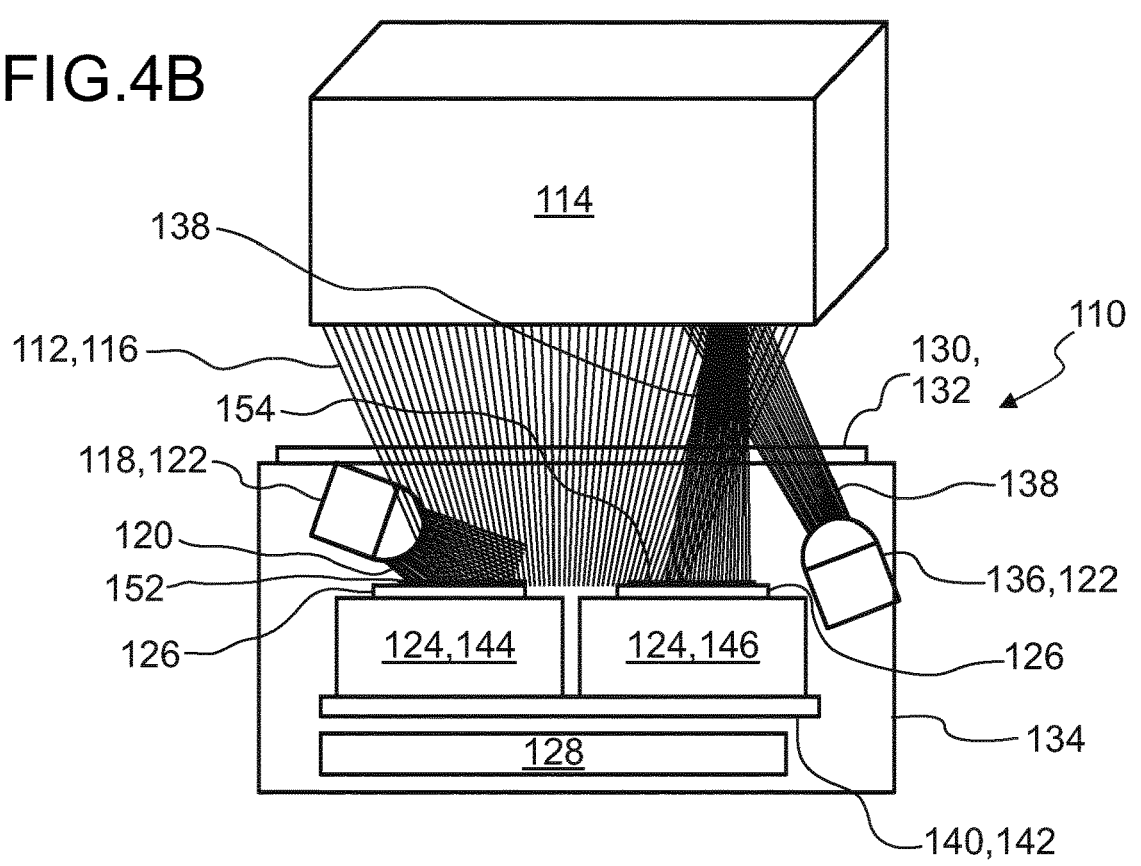

FIGS. 4A and 4B show exemplary embodiments of the spectral sensing device 110 comprising at least two individual photosensitive detectors 124. At least one of the individual photosensitive detectors 124 may be positioned on the temperature stabilizing element 140 for temperature stabilization. The photosensitive region 126 of at least one first photosensitive detector 144 may be designated for receiving the modulated optical radiation 120. The photosensitive region 126 of at least one second photosensitive detector 146 may be designated for receiving the optical radiation 112 provided by the at least one measurement object 114 and the modulated optical radiation 120. The photosensitive region 126 of the second photosensitive detector 146 may further be designated for additionally receiving the further modulated optical radiation 138 emitted by the further radiation emitting element 136. The spectral sensing device 110 may further comprise at least one radiation separating element 148. The radiation separating element 148 may specifically be designated and arranged for separating the modulated optical radiation 120 emitted by the radiation emitting element 118 from the further optical radiation 138 emitted by the further radiation emitting element 136.

As FIG. 4A shows, the radiation separating element 148 may comprise at least one non-transparent optical element 150. The non-transparent optical element 150 may be designated and arranged in a manner that the photosensitive region 126 of the first photosensitive detector 144 may only receive the modulated optical radiation 120 emitted by the radiation emitting element 118 and that the photosensitive region 126 of the second photosensitive detector 146 may only receive the further modulated optical radiation 138 emitted by the further radiation emitting element 136. The non-transparent optical element 150 may further be designated and arranged in a manner that the photosensitive region 126 of the first photosensitive detector 144 and/or the photosensitive region 126 of the second photosensitive detector 146 may, additionally or alternatively, receive the optical radiation 112 provided by the measurement object 114.

As FIG. 4B shows, the radiation separating element 148 may comprise at least one of at least one first optical filter element 152 and at least one second optical filter element 154. The first optical filter element 152 may be designated and arranged in a manner that the photosensitive region 126 of the first photosensitive detector 144 may only receive the modulated optical radiation 120 emitted by the radiation emitting element 118. The first optical filter element 152 may further be designated and arranged in a manner that the photosensitive region 126 of the first photosensitive detector 144 may, additionally or alternatively, receive the optical radiation 112 provided by the measurement object 114. The second optical filter element 154 may be designated and arranged in a manner that the photosensitive region 126 of the second photosensitive detector 146 may receive the further modulated optical radiation 138 emitted by the further radiation emitting element 136. The second optical filter element 154 may further be designated and arranged in a manner that the photosensitive region 126 of the second photosensitive detector 146 additionally or alternatively receives the optical radiation 112 provided by the measurement object 114.

Figure 5A:
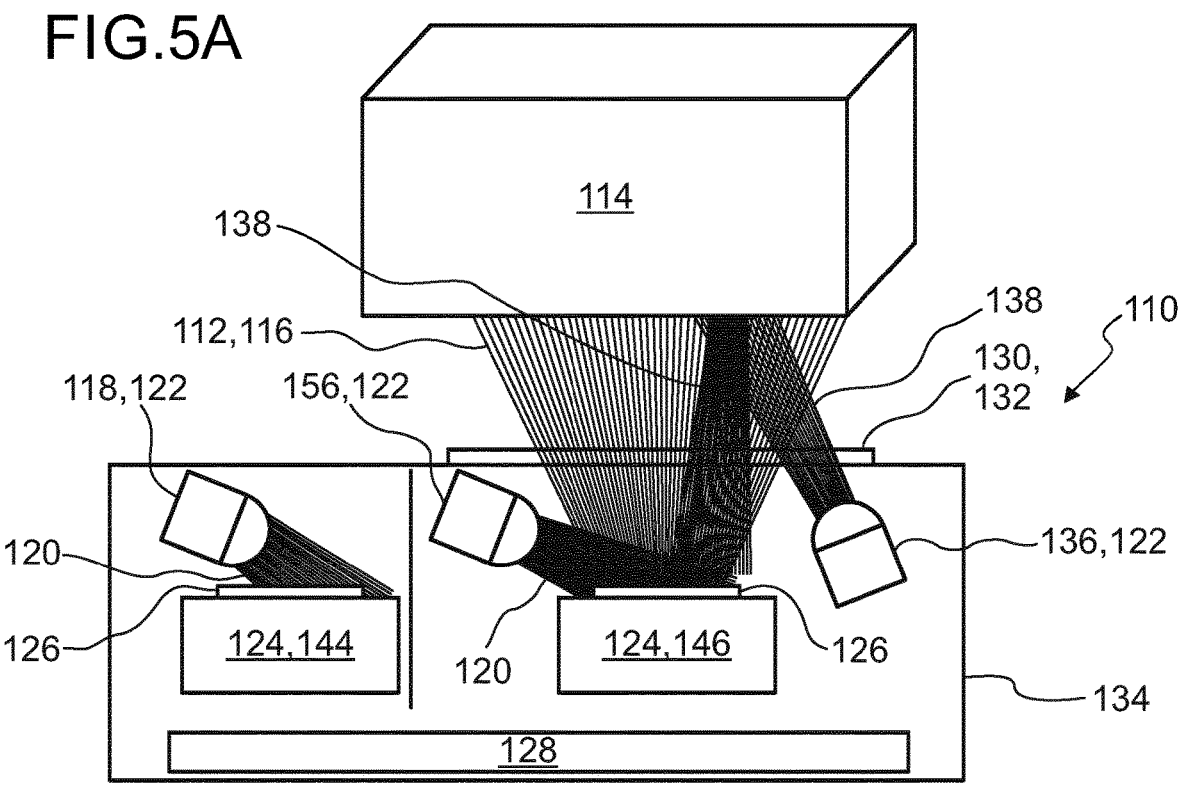
Figure 5B:
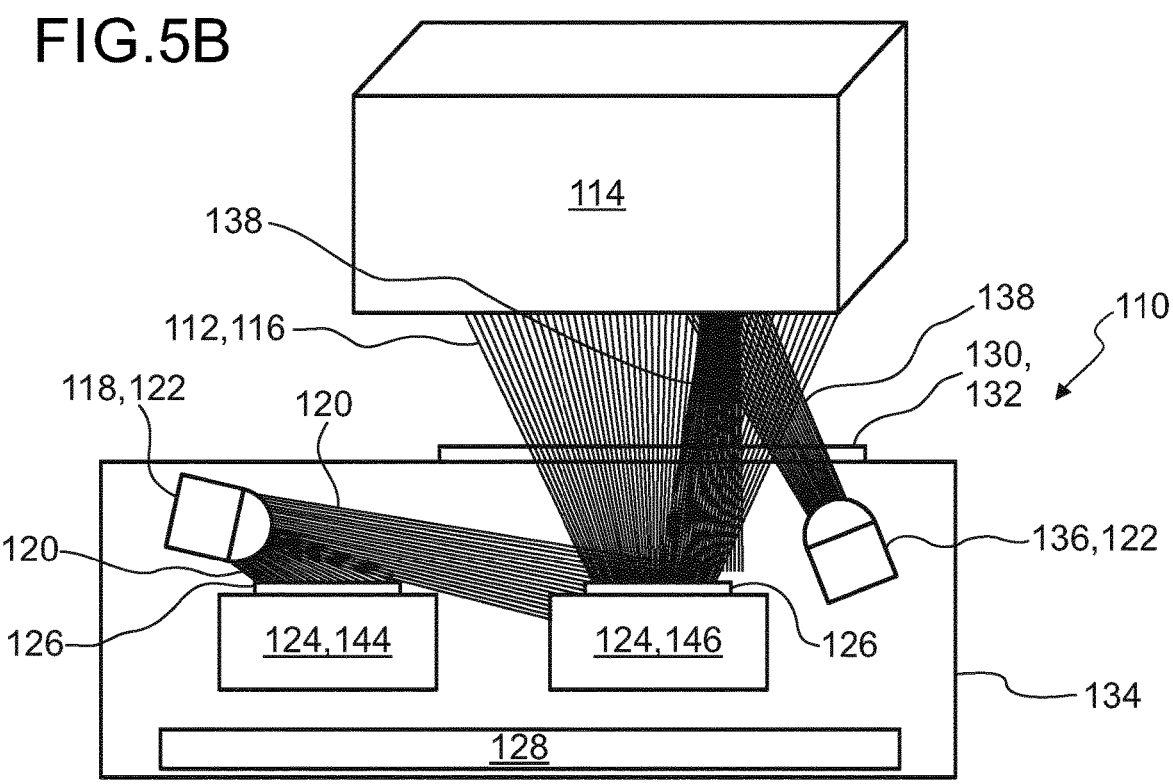
Figure 5C:
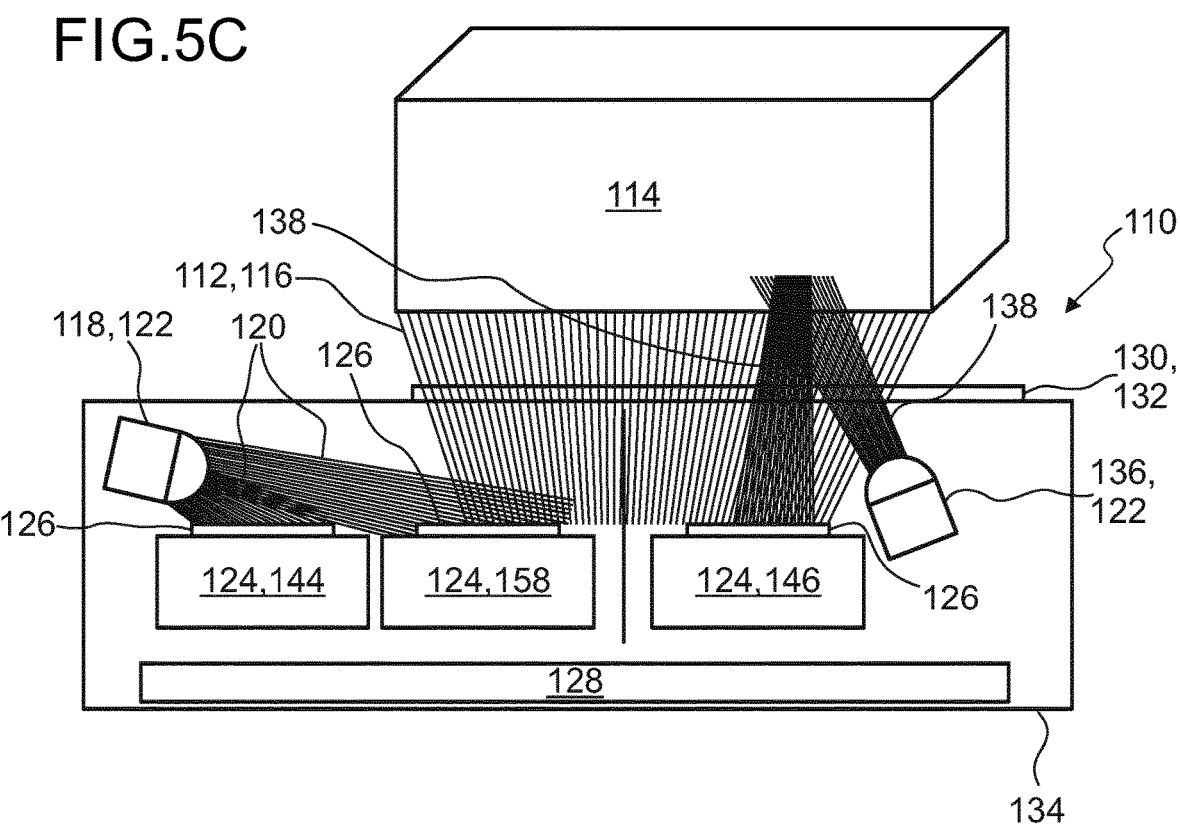

FIGS. 5A to 5C show exemplary embodiments of the spectral sensing device 110 comprising a plurality of photosensitive detectors 124, which are arranged such that at least one photosensitive detector 124 may not receive optical radiation 112 provided by the measurement object 114.

As shown in FIG. 5A, the spectral sensing device 110 may comprise two individual photosensitive detectors 124 arranged in a manner that the photosensitive region 126 of the first photosensitive detector 144 may only receive the modulated optical radiation 120 and the photosensitive region 126 of second photosensitive detector 146 may only receive the further modulated optical radiation 138 and the optical radiation 112 provided by the at least one measurement object 114. For this purpose, the partially reflecting optical element 132 may only extent in front of the second photosensitive detector 146. Thus, the optical radiation 112 provided by the at least one measurement object 114 going through the partially reflecting optical element 132 may only be able to reach the second photosensitive detector 146. Further, the first photosensitive detector 144 and the second photosensitive detector 146 may be separated by the radiation separating element 148, specifically by the non-transparent optical element 150. The non-transparent optical element 150 may specifically ensure that the first photosensitive detector 144 does not receive the further modulated optical radiation 120 and/or the optical radiation provided by the measurement object 114.

Additionally, the exemplary embodiment of the spectral sensing device 110 as depicted in FIG. 5A may comprise a second radiation emitting element 156, which may also be emitting the modulated optical radiation 120. The second radiation emitting element 156 may specifically emit the modulated optical radiation 120 towards the second photosensitive detector 146. Thus, the second photosensitive detector 146 may, additionally, receive the modulated optical radiation 120. As shown in FIG. 5B, the photosensitive detectors 124 may, alternatively, be arranged in a manner that the second photosensitive detector 146 may also receive the modulated optical radiation 120 emitted by the radiation emitting element 118.

As shown in FIG. 5C, the spectral sensing device 110 may comprise at least a third photosensitive detector 158. The photosensitive region 126 of the third photosensitive detector 158 may only receive the modulated optical radiation 120 and the optical radiation 114 provided by the measurement object 114. The modulated optical radiation 120 may, specifically, only reach the first photosensitive detector 144 and the third photosensitive detector 156 but not anymore the second photosensitive detector 146. Thus, the second photosensitive detector 146 may only receive the further modulated optical radiation 138 and the optical radiation 112 provided by the measurement object 114. As FIG. 5C shows, the radiation separating element 148, specifically the non-transparent optical element 150, may be positioned between the second photosensitive detector 146 and the third photosensitive detector 156, specifically, in order to ensure that the modulated optical radiation 120 may not reach the second photosensitive detector 146. The partially reflecting optical element 132 may only extent in front of the second photosensitive detector 146 and the third photosensitive detector 156. Thus, the optical radiation 112 provided by the at least one measurement object 114 going through partially reflecting optical element 132 may only be able to reach the second photosensitive detector 146 and the third photosensitive detector 156.

Figure 6:
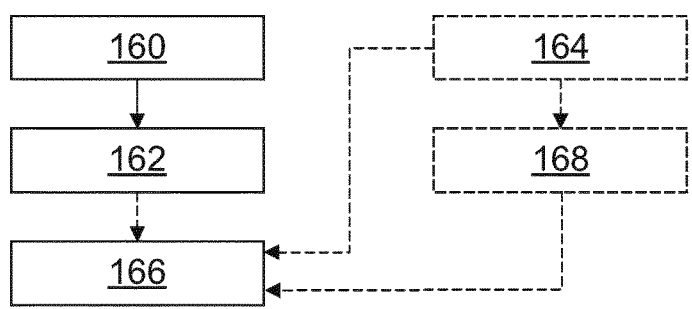

FIG. 6 illustrates a schematic view of an exemplary embodiment of a method for measuring the optical radiation 112 provided by the measurement object 114 according to the present invention.

In an emitting step 160 according to step a), the modulated optical radiation 120 is emitted by using the emitting element 118. The modulated optical radiation is guided within the spectral sensing device 110 towards the photosensitive detector 124. Specifically, the modulated optical radiation 120 may be reflected at the partially reflecting optical element 132 towards the photosensitive detector 124.

In a measurement information generating step 162 according to step b), at least one piece of measurement information about the illumination of the at least one photosensitive region 126 by the optical radiation 112 provided by the at least one measurement object 114 is generated by using the evaluation unit 128 by using at least one modulated detector signal generated by the illumination of the photosensitive region 126 by a superposition of the modulated optical radiation 120 and the optical radiation 112 provided by the at least one measurement object 114.

In an optional further emitting step 164 according to step c), the further modulated optical radiation 138 may be emitted by using the further radiation emitting element 136. The further modulated optical radiation 138 may be guided towards the measurement object 114. Specifically, the further modulated optical radiation 138 may be transmitted through the optical element 130, more specifically through the partially reflecting optical element 132 towards the measurement object 114. The further modulated optical radiation 138 may then at least partially be reflected by the measurement object 114 towards the photosensitive detector 124.

In a an optional spectral information generating step 166 according to step d), at least one piece of spectral information about the at least one measurement object 114 may be generated by using at least one modulated detector signal generated by the illumination of the one photosensitive region 126 by the optical radiation 112 provided by the measurement object 114 and the further modulated optical radiation 138 and the at least one piece of measurement information. Specifically, the optical radiation 112 provided by the measurement object 114 may be transmitted through the optical element 130, more specifically through the partially reflecting optical element 132 before reaching the photosensitive region 126.

In an optional calibration information generating step 168 according to step e), at least one piece of calibration information may be generated by using the at least one evaluation unit 128 by further comparing the at least one detector signal as generated by the illumination of the at least one photosensitive region 126 by the modulated optical radiation 120 and at least one further detector signal as generated by the illumination of the at least one photosensitive region 126 by the further modulated optical radiation 138.

As already indicated above, the emitting step 160 and the further emitting step 164 may, specifically, be conducted simultaneously. Accordingly, the measurement information generating step 162 and the calibration information generating step 168 may, specifically, also be conducted simultaneously. Thus, the results obtained in the measurement information generating step 162 and/or the calibration information generating step 168 can, specifically simultaneously, be used, eventually, in the spectral information generating step 166.

For further details concerning the method for measuring the optical radiation 112, reference may be made to the description of the spectral sensing device 110 as provided above.

LIST OF REFERENCE NUMBERS 110 spectral sensing device
112 optical radiation 114 measurement object
116 non-modulated optical radiation
118 radiation emitting element
120 modulated optical radiation
122 semiconductor-based radiation source
124 photosensitive detector
126 photosensitive region
128 evaluation unit
130 optical element
132 partially reflecting optical element
134 housing
136 further radiation emitting element
138 further modulated optical radiation
140 temperature stabilizing element
142 thermoelectric cooler
144 first photosensitive detector
146 second photosensitive detector
148 radiation separating element
150 non-transparent optical element
152 first optical filter element
154 second optical filter element
156 second radiation emitting element
158 third photosensitive detector
160 emitting step
162 measurement information generating step
164 further emitting step
166 spectral information generating step
168 calibration information generating step

The invention claimed is:

1. A spectral sensing device for measuring optical radiation emitted by at least one measurement object, wherein the optical radiation emitted by the at least one measurement object comprises non-modulated optical radiation, the spectral sensing device comprising:

at least one radiation emitting element, wherein the at least one radiation emitting element is designated for emitting modulated optical radiation;

at least one photosensitive detector, wherein the at least one photosensitive detector has at least one photosensitive region designated for receiving optical radiation, wherein at least one detector signal generated by the at least one photosensitive detector is dependent on an illumination of the at least one photosensitive region; and at least one evaluation unit, wherein the at least one evaluation unit is configured for generating at least one piece of measurement information about the illumination of the at least one photosensitive region by the optical radiation emitted by the at least one measurement object by using at least one modulated detector signal as generated by the illumination of the at least one photosensitive region by a superposition of the modulated optical radiation and the optical radiation emitted by the at least one measurement object, wherein the spectral sensing device is arranged in a manner that the modulated optical radiation is guided within the spectral sensing device towards the at least one photosensitive detector.

2. The spectral sensing device according to claim 1, wherein the at least one piece of measurement information relates to a responsivity of the at least one photosensitive detector.

3. The spectral sensing device according to claim 1, wherein the at least one piece of measurement information comprises at least one of a change $\Delta R$ in a resistance of the at least one photosensitive detector and a responsivity dependent quotient of the at least one photosensitive detector.

4. The spectral sensing device according to claim 3, wherein the at least one responsivity dependent quotient is defined as a quotient of the change $\Delta R$ in the resistance of the at least one photosensitive detector divided by a DC resistance $R_{DC}$ of the at least one photosensitive detector.

5. The spectral sensing device according to claim 3, wherein the change $\Delta R$ in the resistance of the at least one photosensitive detector is induced by a superposition of the optical radiation emitted by the at least one measurement object with the modulated optical radiation emitted by the at least one radiation emitting element at the at least one photosensitive detector.

6. The spectral sensing device according to claim 1, wherein the at least one radiation emitting element is designated for emitting the modulated optical radiation in a manner that the modulated optical radiation has a constant average illumination power over a time interval.

7. The spectral sensing device according to claim 1, comprising at least two individual photosensitive detectors, wherein the at least one photosensitive region of at least one first photosensitive detector is designated for receiving the modulated optical radiation; and the at least one photosensitive region of at least one second photosensitive detector is designated for receiving the optical radiation emitted by the at least one measurement object and the modulated optical radiation.

8. The spectral sensing device according to claim 7, further comprising at least one radiation separating element, wherein the at least one radiation separating element is designated and arranged for separating the modulated optical radiation from the optical radiation emitted by the at least one measurement object.

9. The spectral sensing device according to claim 8, wherein the at least one radiation separating element comprises at least one first optical filter element, wherein the at least one first optical filter element is designated and arranged in a manner that the at least one photosensitive region of the at least one first photosensitive detector only receives the modulated optical radiation.

10. The spectral sensing device according to claim 8, wherein the at least one radiation separating element comprises at least one non-transparent optical element, wherein the at least one non-transparent optical element is designated and arranged in a manner that the at least one photosensitive region of the at least one first photosensitive detector only receives the modulated optical radiation.

11. The spectral sensing device according to claim 1, further comprising at least one further radiation emitting element, wherein the at least one further radiation emitting element is designated for emitting further modulated optical radiation;

wherein the at least one evaluation unit is further configured for generating at least one piece of spectral information about the at least one measurement object by using at least one modulated detector signal as generated by the illumination of the at least one photosensitive region by a superposition of the optical radiation emitted by the at least one measurement object and the further modulated optical radiation; and the at least one piece of measurement information, wherein the spectral sensing device is arranged in a manner that the further modulated optical radiation is guided towards the at least one measurement object.

12. The spectral sensing device according to claim 11, wherein the at least one evaluation unit is further configured for generating at least one piece of calibration information by comparing the at least one modulated detector signal as generated by the illumination of the at least one photosensitive region by the modulated optical radiation and at least one further modulated detector signal as generated by the illumination of the at least one photosensitive region by the further modulated optical radiation.

13. The spectral sensing device according to claim 11, wherein the at least one further radiation emitting element is designated for emitting the further modulated optical radiation in a manner that the further modulated optical radiation has a constant average illumination power over a time interval.

14. The spectral sensing device according to claim 11, wherein the spectral sensing device is arranged in a manner that the further modulated optical radiation is reflected by the at least one measurement object.

15. The spectral sensing device according to claim 11, comprising at least two individual photosensitive detectors, wherein the at least one photosensitive region of at least one further first photosensitive detector is designated for receiving the modulated optical radiation; and the at least one photosensitive region of at least one further second photosensitive detector is designated for receiving the further modulated optical radiation and the optical radiation emitted by the at least one measurement object.

16. The spectral sensing device according to claim 1, further comprising at least one temperature stabilizing element, wherein the at least one temperature stabilizing element is designated for maintaining a temperature of at least one of the at least one photosensitive detector; and the at least one radiation emitting element at a constant level.

17. The spectral sensing device according to claim 1, further comprising at least one partially reflective optical element to reflect the modulated optical radiation towards the at least one photosensitive detector, the partially reflective optical element transparent to the non-modulated optical radiation emitted by the measurement object.

18. A method for measuring optical radiation emitted by at least one measurement object, wherein the optical radiation emitted by the at least one measurement object comprises non-modulated optical radiation, the method comprising the following steps:

a) emitting modulated optical radiation by using at least one radiation emitting element, wherein the modulated optical radiation is guided within a spectral sensing device towards at least one photosensitive detector, wherein the at least one photosensitive detector has at least one photosensitive region designated for receiving optical radiation, wherein at least one detector signal generated by the at least one photosensitive detector is dependent on an illumination of the at least one photosensitive region; and b) generating at least one piece of measurement information about the illumination of the at least one photosensitive region by the optical radiation emitted by the at least one measurement object by using at least one evaluation unit by using at least one detector signal generated by the illumination of the at least one photosensitive region by a superposition of the modulated optical radiation and the optical radiation emitted by the at least one measurement object.

19. The method according to claim 18, further comprising the following steps:

c) emitting further modulated optical radiation by using at least one further radiation emitting element, wherein the further modulated optical radiation is guided towards the at least one measurement object; and d) generating at least one piece of spectral information about the at least one measurement object by using the at least one evaluation unit by using at least one modulated detector signal as generated by the illumination of the at least one photosensitive region by a superposition of the optical radiation emitted by the at least one measurement object and the further modulated optical radiation; and the at least one piece of measurement information.

20. The method according to claim 18, further comprising the following step:

e) generating at least one piece of calibration information by using the at least one evaluation unit by further comparing the at least one detector signal as generated by the illumination of the at least one photosensitive region by the modulated optical radiation and at least one further detector signal as generated by the illumination of the at least one photosensitive region by the further modulated optical radiation.

* * * * *